United States Patent [19]

Bricklin et al.

[11] Patent Number: 5,717,939
[45] Date of Patent: Feb. 10, 1998

[54] METHOD AND APPARATUS FOR ENTERING AND MANIPULATING SPREADSHEET CELL DATA

[75] Inventors: Daniel Bricklin; William T. Lynch, both of Newton Highlands, Mass.; John Friend, Pleasanton, Calif.

[73] Assignee: Compaq Computer Corporation, Houston, Tex.

[21] Appl. No.: 558,248

[22] Filed: Nov. 17, 1995

Related U.S. Application Data

[63] Continuation of Ser. No. 795,009, Nov. 18, 1991, abandoned.

[51] Int. Cl.$^6$ .................................................. G06T 1/00
[52] U.S. Cl. ........................... 395/764; 395/804; 395/769; 395/172; 345/128; 345/144; 382/179; 382/182; 382/189; 382/200; 382/286; 382/288; 382/290
[58] Field of Search ........................... 345/139–151, 345/155, 156–183, 127–131; 382/177, 179, 181–182, 186–189, 199–200, 201–203, 286–301, 310–311; 395/764–765, 769, 350, 358, 804, 167–169, 171–172

[56] References Cited

U.S. PATENT DOCUMENTS

| | | | |
|---|---|---|---|
| 4,156,911 | 5/1979 | Crane et al. | 364/419 |
| 4,656,317 | 4/1987 | Tsugei et al. | 178/18 |
| 4,727,588 | 2/1988 | Fox et al. | 382/13 |
| 4,755,955 | 7/1988 | Kimura et al. | 364/518 |
| 4,763,356 | 8/1988 | Day, Jr. et al. | 379/368 |
| 4,790,028 | 12/1988 | Ramage | 382/47 |
| 4,860,372 | 8/1989 | Kuzunuki et al. | 382/13 |
| 4,872,064 | 10/1989 | Tutt et al. | 358/464 |
| 4,907,282 | 3/1990 | Daly et al. | 382/9 |
| 4,928,092 | 5/1990 | Iizuka | 340/707 |
| 4,941,195 | 7/1990 | Tanaka et al. | 382/61 |
| 4,953,225 | 8/1990 | Togawa et al. | 382/13 |
| 5,063,600 | 11/1991 | Norwood | 382/13 |
| 5,093,907 | 3/1992 | Hwong et al. | 395/152 |
| 5,138,668 | 8/1992 | Abe | 382/9 |
| 5,155,813 | 10/1992 | Donoghue et al. | 395/275 |
| 5,157,737 | 10/1992 | Sklarew | 382/13 |
| 5,165,012 | 11/1992 | Crandall et al. | 395/100 |
| 5,169,342 | 12/1992 | Steele et al. | 434/112 |
| 5,204,959 | 4/1993 | Sakuragi | 395/600 |
| 5,208,906 | 5/1993 | Morgan | 395/148 |
| 5,231,579 | 7/1993 | Tsuchiya et al. | 364/419 |
| 5,237,628 | 8/1993 | Levitan | 382/61 |
| 5,252,951 | 10/1993 | Tannenbaum et al. | 345/156 |
| 5,255,363 | 10/1993 | Seyler | 395/164 |
| 5,260,697 | 11/1993 | Barrett et al. | 345/173 |
| 5,267,327 | 11/1993 | Hirayama | 382/13 |
| 5,276,794 | 1/1994 | Lamb, Jr. | 395/149 |
| 5,347,295 | 9/1994 | Agulnick et al. | 345/156 |
| 5,410,334 | 4/1995 | Comerford | 345/179 |
| 5,455,901 | 10/1995 | Friend et al. | 395/149 |

OTHER PUBLICATIONS

Simpson, The Best Book: Lotus™ 1–2–3™, 1984, pp. 81–102.
Quattro Pro User's Guide, 1990, pp. 17–20.
Lucid 3–D Reference Guide, 1987, pp. N8–N25.
Microsoft Excel User's Guide; 1990; pp. 76–133, 271–272.

Primary Examiner—Joseph H. Feild
Attorney, Agent, or Firm—Fish & Neave; Jeffrey H. Ingerman; Matthew T. Byrne

[57] ABSTRACT

A method for entering and manipulating spreadsheet cell data is described. The present invention provides a method for determining the target cell for written information and for scaling the information to fit within the boundaries of the target cell. A multi-tiered character recognition scheme is used to improve the accuracy and speed of character recognition and translation of handwritten data. The original handwritten data is preserved so that either the translated data or original data may be displayed. The present invention also provides for improved editing of cell entries by allowing a plurality of editing tools to be selected. Manipulation of blocks of data can be accomplished with simple gestures. Arithmetic, statistical and logical functions can be invoked with a single command.

65 Claims, 34 Drawing Sheets

Figure 1C

|   | A | B | C | D | E | F | G | H |
|---|---|---|---|---|---|---|---|---|
| 1 |  |  | AMERICAN | WIDGET | COMPANY |  |  |  |
| 2 |  |  |  |  |  |  |  |  |
| 3 | Invoice No. |  |  |  | Order Date: |  |  |  |
| 4 |  |  |  |  |  |  |  |  |
| 5 | Customer Name: |  |  |  | Delivery Date: |  |  |  |
| 6 | Address: |  |  |  |  |  |  |  |
| 7 |  |  |  |  |  |  |  |  |
| 8 |  |  |  |  |  |  |  |  |
| 9 | Item Name | Size | Qty. | Unit Price |  | Total Price |  |  |
| 10 |  |  |  |  |  |  |  |  |
| 11 |  |  |  |  |  |  |  |  |
| 12 |  |  |  |  |  |  |  |  |
| 13 |  |  |  |  |  |  |  |  |
| 14 |  |  |  |  |  |  |  |  |
| 15 |  |  |  |  |  |  |  |  |
| 16 |  |  |  |  |  |  |  |  |
| 17 |  |  |  |  |  |  |  |  |
| 18 |  |  |  | Subtotal: |  |  |  |  |
| 19 |  |  |  | 7.5% Sales Tax: |  |  |  |  |
| 20 |  |  |  |  |  |  |  |  |
| 21 |  |  |  | Amount Due: |  |  |  |  |
| 22 |  |  |  |  |  |  |  |  |

Figure 2

|   | F: 0 | +C10*D10 | | | | | | |
|---|---|---|---|---|---|---|---|---|
|   | A | B | C | D | E | F | G | H |
| 1 | | | AMERICAN | WIDGET | COMPANY | | | |
| 2 | | | | | | | | |
| 3 | Invoice No. | 1234 | | | Order Date: | | 1/1/91 | |
| 4 | | | | | | | | |
| 5 | Customer Name: | Acme Sales | | | Delivery Date: | | 2/31/91 | |
| 6 | Address: | 345 Main Street | | | | | | |
| 7 | | Anytown, USA | | | | | | |
| 8 | | | | | | | | |
| 9 | Item Name | Size | Qty. | Unit Price | | Total Price | | |
| 10 | Std. Widget | 6" | 50 | $5.00 | | $250.00 | | |
| 11 | Std. Widget | 8" | 50 | $7.50 | | $375.00 | | |
| 12 | MiniWidget | 1" | 25 | $0.75 | | $18.75 | | |
| 13 | MiniWidget | 2" | 75 | $1.25 | | $93.75 | | |
| 14 | MaxiWidget | 12" | 10 | $13.25 | | $132.50 | | |
| 15 | MaxiWidget | 15" | 5 | $24.95 | | $124.75 | | |
| 16 | | | | | | | | |
| 17 | | | | | | | | |
| 18 | | | | | Subtotal: | $994.75 | | |
| 19 | | | | | 7.5% Sales Tax: | $74.61 | | |
| 20 | | | | | | | | |
| 21 | | | | | Amount Due: | $1,069.36 | | |
| 22 | | | | | | | | |

Figure 3

| F18 | @SUM(F10...F17) | | | | | | |
|---|---|---|---|---|---|---|---|
| | A | B | C | D | E | F | G | H |
| 1 | | | AMERICAN | WIDGET | COMPANY | | | |
| 2 | | | | | | | | |
| 3 | Invoice No. | 1234 | | | Order Date: | 1/1/91 | | |
| 4 | | | | | | | | |
| 5 | Customer Name: | Acme Sales | | | Delivery Date: | 2/31/91 | | |
| 6 | Address: | 345 Main Street | | | | | | |
| 7 | | Anytown, USA | | | | | | |
| 8 | | | | | | | | |
| 9 | Item Name | Size | Qty. | Unit Price | | Total Price | | |
| 10 | Std. Widget | 6" | 50 | $5.00 | | $250.00 | | |
| 11 | Std. Widget | 8" | 50 | $7.50 | | $375.00 | | |
| 12 | MiniWidget | 1" | 25 | $0.75 | | $18.75 | | |
| 13 | MiniWidget | 2" | 75 | $1.25 | | $93.75 | | |
| 14 | MaxiWidget | 12" | 10 | $13.25 | | $132.50 | | |
| 15 | MaxiWidget | 15" | 5 | $24.95 | | $124.75 | | |
| 16 | | | | | | | | |
| 17 | | | | | | | | |
| 18 | | | | Subtotal: | | $994.75 | | |
| 19 | | | | 7.5% Sales Tax: | | $74.61 | | |
| 20 | | | | | | | | |
| 21 | | | | Amount Due: | | $1,069.36 | | |
| 22 | | | | | | | | |

Figure 4

| F19 | +F18*0.075 | | | | | | |
|---|---|---|---|---|---|---|---|
| | A | B | C | D | E | F | G | H |
| 1 | | | AMERICAN | WIDGET | COMPANY | | | |
| 2 | | | | | | | | |
| 3 | Invoice No. | 1234 | | | Order Date: | | 1/1/91 | |
| 4 | | | | | | | | |
| 5 | Customer Name: | Acme Sales | | | Delivery Date: | | 2/31/91 | |
| 6 | Address: | 345 Main Street | | | | | | |
| 7 | | Anytown, USA | | | | | | |
| 8 | | | | | | | | |
| 9 | Item Name | Size | Qty. | Unit Price | | Total Price | | |
| 10 | Std. Widget | 6" | 50 | $5.00 | | $250.00 | | |
| 11 | Std. Widget | 8" | 50 | $7.50 | | $375.00 | | |
| 12 | MiniWidget | 1" | 25 | $0.75 | | $18.75 | | |
| 13 | MiniWidget | 2" | 75 | $1.25 | | $93.75 | | |
| 14 | MaxiWidget | 12" | 10 | $13.25 | | $132.50 | | |
| 15 | MaxiWidget | 15" | 5 | $24.95 | | $124.75 | | |
| 16 | | | | | | | | |
| 17 | | | | | | | | |
| 18 | | | | Subtotal: | | $994.75 | | |
| 19 | | | | 7.5% Sales Tax: | | $74.61 | | |
| 20 | | | | | | | | |
| 21 | | | | Amount Due: | | $1,069.36 | | |
| 22 | | | | | | | | |

Figure 5

| F21 | +F18+F19 | | | | | | |
|---|---|---|---|---|---|---|---|
| | A | B | C | D | E | F | G | H |
| 1 | | | AMERICAN | WIDGET | COMPANY | | | |
| 2 | | | | | | | | |
| 3 | Invoice No. | 1234 | | | Order Date: | | 1/1/91 | |
| 4 | | | | | | | | |
| 5 | Customer Name: | Acme Sales | | | Delivery Date: | | 2/31/91 | |
| 6 | Address: | 345 Main Street | | | | | | |
| 7 | | Anytown, USA | | | | | | |
| 8 | | | | | | | | |
| 9 | Item Name | Size | Qty. | Unit Price | | Total Price | | |
| 10 | Std. Widget | 6" | 50 | $5.00 | | $250.00 | | |
| 11 | Std. Widget | 8" | 50 | $7.50 | | $375.00 | | |
| 12 | MiniWidget | 1" | 25 | $0.75 | | $18.75 | | |
| 13 | MiniWidget | 2" | 75 | $1.25 | | $93.75 | | |
| 14 | MaxiWidget | 12" | 10 | $13.25 | | $132.50 | | |
| 15 | MaxiWidget | 15" | 5 | $24.95 | | $124.75 | | |
| 16 | | | | | | | | |
| 17 | | | | | | | | |
| 18 | | | | Subtotal: | | $994.75 | | |
| 19 | | | | 7.5% Sales Tax: | | $74.61 | | |
| 20 | | | | | | | | |
| 21 | | | | Amount Due: | | $1,069.36 | | |
| 22 | | | | | | | | |

Figure 6

| | D10 | 5 | | | | | | |
|---|---|---|---|---|---|---|---|---|
| | A | B | C | D | E | F | G | H |
| 1 | | | AMERICAN | WIDGET | COMPANY | | | |
| 2 | | | | | | | | |
| 3 | Invoice No. | 1234 | | | Order Date: | | 1/1/91 | |
| 4 | | | | | | | | |
| 5 | Customer Name: | Acme Sales | | | Delivery Date: | | 2/31/91 | |
| 6 | Address: | 345 Main Street | | | | | | |
| 7 | | Anytown, USA | | | | | | |
| 8 | | | | | | | | |
| 9 | Item Name | Size | Qty. | Unit Price | | Total Price | | |
| 10 | Std. Widget | 6" | 50 | $5.00 | | $250.00 | | |
| 11 | Std. Widget | 8" | 50 | $7.50 | | $375.00 | | |
| 12 | MiniWidget | 1" | 25 | $0.75 | | $18.75 | | |
| 13 | MiniWidget | 2" | 75 | $1.25 | | $93.75 | | |
| 14 | MaxiWidget | 12" | 10 | $13.25 | | $132.50 | | |
| 15 | MaxiWidget | 15" | 5 | $24.85 | | $124.75 | | |
| 16 | | | | | | | | |
| 17 | | | | | | | | |
| 18 | | | | Subtotal: | | $994.75 | | |
| 19 | | | | 7.5% Sales Tax: | | $74.61 | | |
| 20 | | | | | | | | |
| 21 | | | | Amount Due: | | $1,069.36 | | |
| 22 | | | | | | | | |

Figure 7

| Notebook Contents | |
|---|---|
| Document  Edit  Create  View  Show  Sort | |
| <u>Name</u> | <u>Page</u> |
| 🗎 Notes | 2 |
| 📒 Samples | 3 |

Contents / Notes / Samples

? ✓ 🕒 🗎 ☐ ⌨ 📷 ▼▲
Help  Preferences  Tools  Stationary  Disks  Keyboard  Installer  In Out

Figure 9

|  | A | B | C | D | E | F | G | H |
|---|---|---|---|---|---|---|---|---|
| 1 |  |  | AMERICAN WIDGET COMPANY |  |  |  |  |  |
| 2 |  |  |  |  |  |  |  |  |
| 3 | Invoice No. |  |  |  | Order Date: |  |  |  |
| 4 |  |  |  |  |  |  |  |  |
| 5 | Customer Name: |  |  |  | Delivery Date: |  |  |  |
| 6 | Address: |  |  |  |  |  |  |  |
| 7 |  |  |  |  |  |  |  |  |
| 8 |  |  |  |  |  |  |  |  |
| 9 | Item Name |  | Size | Qty. | Unit Price |  | Total Price |  |
| 10 |  |  |  |  |  |  |  |  |
| 11 |  |  |  |  |  |  |  |  |
| 12 |  |  |  |  |  |  |  |  |
| 13 |  |  |  |  |  |  |  |  |
| 14 |  |  |  |  |  |  |  |  |
| 15 |  |  |  |  |  |  |  |  |
| 16 |  |  |  |  |  |  |  |  |
| 17 |  |  |  |  |  |  |  |  |
| 18 |  |  |  | Subtotal: |  |  |  |  |
| 19 |  |  |  | 7.5% Sales Tax: |  |  |  |  |
| 20 |  |  |  |  |  |  |  |  |
| 21 |  |  |  | Amount Due: |  |  |  |  |
| 22 |  |  |  |  |  |  |  |  |
| 23 |  |  |  |  |  |  |  |  |
| 24 |  |  |  |  |  |  |  |  |
| 25 |  |  |  |  |  |  |  |  |
| 26 |  |  |  |  |  |  |  |  |
| 27 |  |  |  |  |  |  |  |  |

Figure 11

|   | A | B | C | D | E | F | G | H |
|---|---|---|---|---|---|---|---|---|
| 1 |   |   | AMERICAN WIDGET COMPANY | | | | | |
| 2 |   |   |   |   |   |   |   |   |
| 3 | Invoice No. | 1234 |   |   | Order Date: | | | |
| 4 |   |   |   |   |   |   |   |   |
| 5 | Customer Name | *Acme Sales* | | | Delivery Date: | | | |
| 6 | Address: |   |   |   |   |   |   |   |
| 7 |   |   |   |   |   |   |   |   |
| 8 |   |   |   |   |   |   |   |   |
| 9 | Item Name | Size | Qty. | Unit Price | | Total Price | | |
| 10 |   |   |   |   |   |   |   |   |
| 11 |   |   |   |   |   |   |   |   |
| 12 |   |   |   |   |   |   |   |   |
| 13 |   |   |   |   |   |   |   |   |
| 14 |   |   |   |   |   |   |   |   |
| 15 |   |   |   |   |   |   |   |   |
| 16 |   |   |   |   |   |   |   |   |
| 17 |   |   |   |   |   |   |   |   |
| 18 |   |   |   | Subtotal: |   |   |   |   |
| 19 |   |   |   | 7.5% Sales Tax: |   |   |   |   |
| 20 |   |   |   |   |   |   |   |   |
| 21 |   |   |   | Amount Due: |   |   |   |   |
| 22 |   |   |   |   |   |   |   |   |
| 23 |   |   |   |   |   |   |   |   |
| 24 |   |   |   |   |   |   |   |   |
| 25 |   |   |   |   |   |   |   |   |
| 26 |   |   |   |   |   |   |   |   |
| 27 |   |   |   |   |   |   |   |   |

|   | A | B | C | D | E | F | G | H |
|---|---|---|---|---|---|---|---|---|
| 1 |   |   | AMERICAN WIDGET COMPANY | | | | | |
| 2 |   |   |   |   |   |   |   |   |
| 3 | Invoice No. | 1234 |   |   | Order Date: |   |   |   |
| 4 |   |   |   |   |   |   |   |   |
| 5 | Customer Name: | AcmeSales |   |   | Delivery Date: |   |   |   |
| 6 | Address: |   |   |   |   |   |   |   |
| 7 |   |   |   |   |   |   |   |   |
| 8 |   |   |   |   |   |   |   |   |
| 9 | Item Name | Size | Qty. | Unit Price |   | Total Price |   |   |
| 10 |   |   |   |   |   |   |   |   |
| 11 |   |   |   |   |   |   |   |   |
| 12 |   |   |   |   |   |   |   |   |
| 13 |   |   |   |   |   |   |   |   |
| 14 |   |   |   |   |   |   |   |   |
| 15 |   |   |   |   |   |   |   |   |
| 16 |   |   |   |   |   |   |   |   |
| 17 |   |   |   |   |   |   |   |   |
| 18 |   |   |   | Subtotal: |   |   |   |   |
| 19 |   |   |   | 7.5% Sales Tax: |   |   |   |   |
| 20 |   |   |   |   |   |   |   |   |
| 21 |   |   |   | Amount Due: |   |   |   |   |
| 22 |   |   |   |   |   |   |   |   |
| 23 |   |   |   |   |   |   |   |   |
| 24 |   |   |   |   |   |   |   |   |
| 25 |   |   |   |   |   |   |   |   |
| 26 |   |   |   |   |   |   |   |   |
| 27 |   |   |   |   |   |   |   |   |

Figure 14A

|   | A | B | C | D |
|---|---|---|---|---|
| 1 |   |   | AMERICAN WIDGE |   |
| 2 |   |   |   |   |
| 3 | Invoice No. | 1234 |   |   |
| 4 |   |   |   |   |
| 5 | Customer Name: | AcmoSales |   |   |
| 6 | Address: |   |   |   |
| 7 |   |   |   |   |
| 8 |   |   |   |   |
| 9 | Item Name | Size | Qty. | Unit Price |
| 10 |   |   |   |   |
| 11 |   |   |   |   |
| 12 |   |   |   |   |
| 13 |   |   |   |   |
| 14 |   |   |   |   |
| 15 |   |   |   |   |
| 16 |   |   |   |   |
| 17 |   |   |   |   |

Figure 14B

|   | A | B | C | D | E | F | G | H |
|---|---|---|---|---|---|---|---|---|
| 1 |   |   |   | AMERICAN WIDGET COMPANY |   |   |   |   |
| 2 |   |   |   |   |   |   |   |   |
| 3 | Invoice No. | 1234 |   |   | Order Date: |   | 1/1/91 |   |
| 4 |   |   |   |   |   |   |   |   |
| 5 | Customer Name: | Acme Sales |   |   | Delivery Date: |   | 2/31/91 |   |
| 6 | Address: | 345 Main Street |   |   |   |   |   |   |
| 7 |   | Anytown, USA |   |   |   |   |   |   |
| 8 |   |   |   |   |   |   |   |   |
| 9 | Item Name | Size | Qty. | Unit Price | Total Price |   |   |   |
| 10 | Std. Widget | 6" | 50 | $5.00 |   |   |   |   |
| 11 | Std. Widget | 6" | 50 | $6.25 |   |   |   |   |
| 12 | MiniWidget | 1" | 25 | $0.75 |   |   |   |   |
| 13 | MiniWidget | 2" | 75 | $1.25 |   |   |   |   |
| 14 | MaxiWidget | 12" | 10 | $13.25 |   |   |   |   |
| 15 | MaxiWidget | 15" | 5 | $24.95 |   |   |   |   |
| 16 |   |   |   |   |   |   |   |   |
| 17 |   |   |   |   |   |   |   |   |
| 18 |   |   |   | Subtotal: |   |   |   |   |
| 19 |   |   |   | 7.5% Sales Tax: |   |   |   |   |
| 20 |   |   |   |   |   |   |   |   |
| 21 |   |   |   | Amount Due: |   |   |   |   |
| 22 |   |   |   |   |   |   |   |   |
| 23 |   |   |   |   |   |   |   |   |
| 24 |   |   |   |   |   |   |   |   |
| 25 |   |   |   |   |   |   |   |   |
| 26 |   |   |   |   |   |   |   |   |
| 27 |   |   |   |   |   |   |   |   |

|   | A | B | C | D | E | F | G | H |
|---|---|---|---|---|---|---|---|---|
| 1 |   |   | AMERICAN WIDGET COMPANY |   |   |   |   |   |
| 2 |   |   |   |   |   |   |   |   |
| 3 | Invoice No. | 1234 |   |   | Order Date: |   | 1/1/91 |   |
| 4 |   |   |   |   |   |   |   |   |
| 5 | Customer Name: | Acme Sales |   |   | Delivery Date: |   | 2/31/91 |   |
| 6 | Address: | 345 Main Street |   |   |   |   |   |   |
| 7 |   | Anytown, USA |   |   |   |   |   |   |
| 8 |   |   |   |   |   |   |   |   |
| 9 | Item Name | Size | Qty. | Unit Price |   | Total Price |   |   |
| 10 | Std. Widget | 6" | 50 | $5.00 |   | $250.00 |   |   |
| 11 | Std. Widget | 7" | 50 | $6.25 |   | $325.00 |   |   |
| 12 | MiniWidget | 1" | 25 | $0.75 |   | $18.75 |   |   |
| 13 | MiniWidget | 2" | 75 | $1.25 |   | $93.75 |   |   |
| 14 | MaxiWidget | 12" | 10 | $13.25 |   | $132.50 |   |   |
| 15 | MaxiWidget | 15" | 5 | $24.95 |   | $124.75 |   |   |
| 16 |   |   |   |   |   |   |   |   |
| 17 |   |   |   |   |   |   |   |   |
| 18 |   |   |   | Subtotal: |   |   |   |   |
| 19 |   |   |   | 7.5% Sales Tax: |   |   |   |   |
| 20 |   |   |   |   |   |   |   |   |
| 21 |   |   |   | Amount Due: |   |   |   |   |
| 22 |   |   |   |   |   |   |   |   |
| 23 |   |   |   |   |   |   |   |   |
| 24 |   |   |   |   |   |   |   |   |
| 25 |   |   |   |   |   |   |   |   |
| 26 |   |   |   |   |   |   |   |   |
| 27 |   |   |   |   |   |   |   |   |

Figure 23

METHOD AND APPARATUS FOR ENTERING AND MANIPULATING SPREADSHEET CELL DATA

CROSS REFERENCE TO RELATED APPLICATION

This is a continuation of commonly-assigned U.S. patent application Ser. No. 07/795,009, filed Nov. 18, 1991 now abandoned.

BACKGROUND OF THE INVENTION

1. Field of the Invention

The present invention relates to the field of data processing and more particularly to pen based methods and apparatus for entering and manipulating spreadsheet cell data.

2. Background Art

A typical computer system consists of a central processing unit (CPU), main memory, such as random access memory (RAM), a data entry device, including a cursor positioning device, a mass storage device, such as one or more disk drives, a display and/or a printer. In the prior art, the data entry device often consists of a keyboard on which a user enters data by typing. The cursor positioning device of a prior art computer system may be a keypad, "mouse," joystick, or other cursor positioning device.

There are also computer systems that are designed to accept handwritten data entry rather than, or in addition to, keyboard data entry. In a handwritten data entry computer system, the user enters handwritten data directly on the display of the computer system using a pen, stylus, or other writing device. A user may also enter data on a digitizing tablet or other input device, and the written input image is displayed on a separate computer display output device. The writing device for entering handwritten or freestyle stroke input information may be any suitable input device, such as a pen or stylus, mouse, trackball, pointer, or even a person's fingers.

One class of handwriting entry computer system capable of receiving handwritten data input is referred to as "pen based". In a pen based computer system, a user can input information to the computer by "writing" directly on the display. A writing device, such as a pen or stylus, is used to enter information on the display. To input information in a typical pen based computer system, a user touches the stylus to the display and writes as on a piece of paper, that is, by making a series of pen strokes to form letters and words. A line appears on the display that follows the path of travel of the stylus point, so that the pen strokes appear on the display as ink would appear on a handwritten page. Thus, the user enters information into the computer by writing directly on the display. The strokes of writing that appear on the display are referred to here as "ink".

In addition to handwritten letters and words, special functions based on input strokes are supported on pen based computer systems. For example, in one prior art pen based computer system, a writer may delete previously entered handwritten input by making the strokes of an "X" over the unwanted entry. These special functional strokes or actions are referred to here as "gestures".

In computer applications involving entry of numerical data or mixed numbers and text, such as order taking, financial analysis, inventory taking, and recording customer information, a computer program or system known as a "spreadsheet" is often used. In a computer spreadsheet system, words and numbers are arranged in a two dimensional grid of "cells" arranged in horizontal rows and vertical columns. Cells of prior art spreadsheet systems can contain either text, numerical values, or arithmetic formulas that define the content of a cell in terms of the content of certain specified other cells. An important feature of spreadsheet systems is their ability to automatically recalculate all cell values when the values of one or more related cells are changed. Examples of well known prior art spreadsheet programs are VisiCalc® from VisiCorp, Lotus 1-2-3® from Lotus Development Corporation, Excel® from Microsoft Corporation, and Quattro® from Borland International Inc.

Figure 1C:
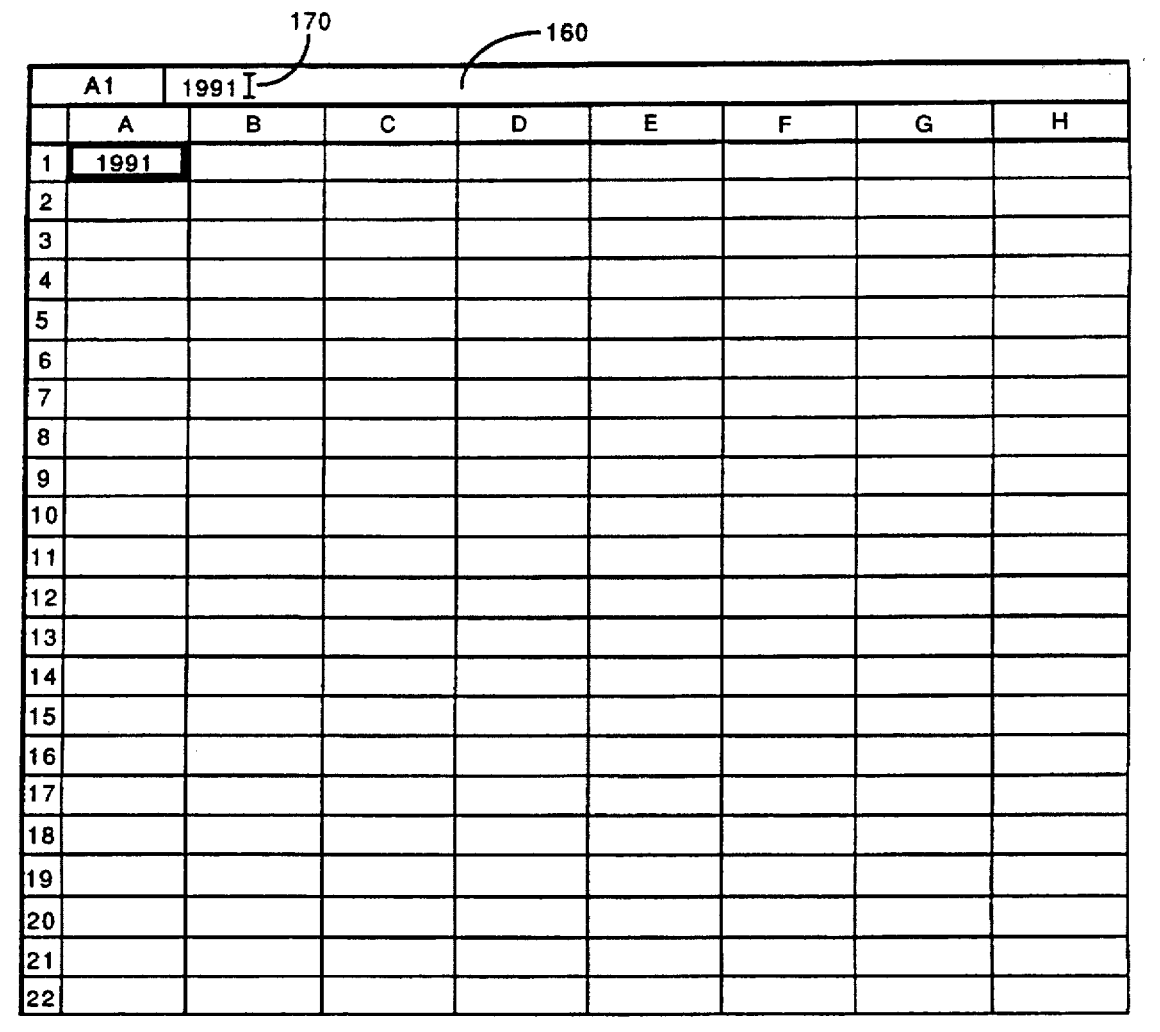

FIGS. 1 through 7 illustrate the operational characteristics of a typical spreadsheet system of the prior art.

FIG. 1A illustrates an empty spreadsheet array consisting of data cells (without any data entered) arranged in a grid consisting of twenty-two rows (labeled 1 through 22) and eight columns (labeled A through H). A particular cell is typically identified by its row and column labels. For instance, top left hand cell 130, being in column A, row 1, is designated cell "A1". This designation is also referred to as the cell's address. Similarly, cell 140 to the right of cell A1 is designated "B1", and cell 150 underneath B1 is designated cell "B2".

Each spreadsheet cell represents a field into which data can be entered. To enter data into a cell, that cell must first be "selected". Methods used by prior art spreadsheet programs to select a cell include moving a cursor to the cell's position with a mouse and pressing an appropriate mouse button, using the "arrow" keys on a computer's keyboard to highlight the appropriate cell, and using a "Go to" command and entering the cell's address on the keyboard. After a cell is selected, data for that cell may be entered. Usually, data is not entered directly into the cell. Instead, data is entered into an "editing bar" (such as editing bar 160 of FIG. 1B) where it can be reviewed and modified before it is entered into the cell. After data has been entered in the editing bar, it is sent to the selected cell by pressing an "Enter" key.

To enter a number such as "1991" into cell A1 of the spreadsheet of FIG. 1A, a cursor is first moved to cell A1. Clicking a mouse button selects cell A1, highlighting it as shown in FIG. 1B. Highlighting indicates that cell A1 has been selected and is the "active" cell. Data can then be entered into the cell (if the cell is empty) or the existing content of the cell may be accessed and changed.

After cell A1 has been selected and made active, text and characters entered on the computer's keyboard can be entered into the cell. As keys of the keyboard are depressed, the character corresponding to each depressed key appears adjacent to a cursor 170 in an "editing bar" 160. As shown in FIG. 1B, editing bar 160 is typically located along the top of the spreadsheet. Referring now to FIG. 1C, after each of the keys "1", "9", "9" and "1" are depressed, the digit corresponding to that key appears in editing bar 160 next to cursor 170. After the entry is complete, an "Accept" command is given, either by pressing an "Enter" key, a mouse button, or by selecting another cell, and the content of the editing bar is entered into the previously selected cell.

In certain prior art spreadsheet systems and programs each text and/or numerical character may be displayed in the selected cell as well as on the editing bar. In VisiCalc®, for example, text characters, but not numerical characters, are displayed on both an editing bar and in the target cell as they are entered. In Excel®, both text and numerical characters are displayed. In other spreadsheet systems, such as the one disclosed in U.S. Pat. No. 5,021,973 issued on Jun. 4, 1991 to Hernandez et al., a cursor for data entry is displayed directly within the selected cell. In Lotus 1-2-3®, the entered data is not displayed digit by digit in the cell itself, but is only displayed in the cell in its entirety after the "Accept" command is given. In each case, however, the same data entry procedure is used: a cell is selected, characters are entered on a keyboard, and an "Accept" command is given. This three-step data entry process is summarized in Table 1.

TABLE 1

| Data Entry into Prior Art Spreadsheet Cell |  |
|---|---|
| 1. | Select cell. |
| 2. | Enter data in keyboard. |
| 3. | Give "Accept" command. |

With respect to pen based computers, U.S. Pat. No. 4,972,496 issued to Sklarew on Nov. 20, 1990 discloses a pen based computer entry system using a pop-up edit window that can be used with a spreadsheet program. According to the patent, when used with a spreadsheet, after the user selects a cell by touching the cell with a special handheld stylus, the pop-up editing window appears next to the cell. Once the cell is selected and the editing window appears, handwritten data is entered on the display with the handheld stylus. Care must be taken to keep the handwriting within the borders of the editing window. After handwritten data has been entered in the editing window, a handwriting recognition algorithm attempts to translate the handwritten input into machine readable characters. If the algorithm is able to recognize characters, these characters are displayed in the editing window above the handwritten entry. If the translated input is correct, the user gives an "Accept" command by touching an appropriate "button" with the stylus, and the translated entry is entered and displayed in the selected cell. If the computer is unable to recognize the input, or if the input is translated incorrectly, the user rewrites the entry on the display until it is correctly translated. Table 2 summarizes these steps for entering data for the spreadsheet disclosed by Sklarew.

TABLE 2

| Data Entry into Spreadsheet of Sklarew |  |
|---|---|
| 1. | Select cell. |
| 2. | Enter data on Editing Window. |
| 3. | Review translation. |
| 4. | Reenter data if necessary. |
| 5. | Repeat steps 2-4 if necessary. |
| 6. | Give "Accept" command. |

FIGS. 2 through 6 illustrate how numerical values, text and formulas can be entered into certain cells of the spreadsheet of FIG. 1A to create an order form that a company could use to take customer orders.

FIG. 2 illustrates how text is entered into selected cells of the prior art spreadsheet of FIG. 1A to create headings and labels. In FIG. 2, the text "AMERICAN WIDGET COMPANY" has been entered into cell C1, "Invoice No." has been entered into cell A3, "Order Date:" has been entered into cell E3, "Customer Name:" has been entered into cell A5, "Delivery Date:" has been entered into cell E5, "Address:" has been entered into cell A6, "Item Name" has been entered into cell A9, "Size" has been entered into cell B9, "Qty." has been entered into cell C9, "Unit Price" has been entered into cell D9, "Total Price" has been entered into cell F9, "Subtotal:" has been entered into cell D18, "7.5% Sales Tax:" has been entered into cell D19, and "Amount Due:" has been entered into cell D21.

As shown in FIG. 2, the length of the text entered into some of the cells is longer than the width of the cell itself. For example, the entry in cell C1, "AMERICAN WIDGET COMPANY", is almost four cells wide, extending from cell C1 into cells D1, E1 and F1. As long as the adjacent cells are empty, the data in cell C1 is simply displayed full length, as shown in FIG. 2. If these cells are not empty, however, the content of cell C1 is only displayed in abbreviated form. For example, if there is data in cell D1, only "AMERICA", the portion of the text that fits within the boundary of cell C1, is displayed.

One way to prevent long text labels from being cut-off due to conflict with an adjoining cell is to increase the column width. Prior art spreadsheet systems generally allow arbitrary sizing of column widths. In FIG. 2, column A has been widened such that the text contents of cells A3, A5, A6 and A9 fit entirely within the width of the cells. Certain prior art spreadsheet systems allow the height of rows to be changed as well as the width.

FIGS. 3 through 6 illustrate how customer and sales data can be entered into the blank order form of FIG. 2 to create a working order form, and how spreadsheet formulas can be used to perform arithmetic operations on the data entered.

As shown in FIG. 3, a person taking an order enters the invoice number in cell B3, the order date in cell G3, the delivery date in cell G5, the customer's name and address in cells B5 through B7, and the name, size, quantity and unit price of the items ordered in cells B10 through B17, C10 through C17, D10 through D17 and F10 through F17, respectively, depending on how many different items are ordered. In FIG. 3, six items out of the eight for which there is room on the order form have been ordered. There are two empty rows (rows 16 and 17) that may accommodate ordering information for two additional items.

After the order data has been entered in as described above, arithmetic formulas can be used to calculate the total price for each item (cells F10 to F15), the subtotal (cell F18), the sales tax (cell F19), and the total amount due (cell F21), as described below.

The total price for an item is the product of the quantity of that item multiplied by the unit price. For instance, the total price for the 6" Std. Widgets listed in cell A10 is the product of the content of cell C10 (the quantity) multiplied by the content of cell D10 (the unit price). In the example shown in FIG. 3, the formula "+C10*D10" is used to enter this product in cell F10. When cell F10 is selected, the formula for cell F10 ("C+C10*D10") is displayed on editing bar 160, while the numerical product of this formula (50 multiplied by $5.00, namely $250.00) is displayed in the cell itself.

Similar formulas may be used to calculate the total prices of the remaining products listed in FIG. 3. Accordingly, the formulas "+C11*D11", "+C12*D12", "+C13*D13", "+C14*D14", and "+C15*D15" may be entered in cells F11 to F15, respectively.

The specific notation described above for the formulas for cells F10 to F15 is the notation used by VisiCalc®. This notation has also been adopted by Lotus 1-2-3 and similar programs. Other programs and systems may use different notations. For example, in Excel®, an equivalent formula for cell F10 would be expressed as "=C10*D10" instead of "+C10*D10".

Arithmetic formulas can be used to calculate the subtotal for all items ordered (cell F18), the sales tax (cell F19), and the total amount due (cell F21). FIG. 4 shows the formula contained in cell F18 for adding together the total prices in cells F10 to F15 for each of the individual items ordered. In FIG. 4, cell F18 is highlighted and the formula contained in cell F18, namely "@SUM(F10 . . . F17)" is displayed on editing bar 160. This formula defines the content of cell F18 as the sum of the contents of cells F10 to F17. The corresponding numerical value displayed in cell F18 is $250.00 (F10)+$375.00 (F11)+$18.75 (F12)+$93.75 (F13)+$132.50 (F14)+$124.75 (F15)+$0 (F16)+$0 (F17), or $994.75.

The formula for F18 defines the content of cell F18 as the sum of cells F10 through F17, even though cells F16 and F17 are empty. The order form has room for two additional ordered items in rows 16 and 17. These rows are empty in FIG. 4. By defining the content of cell F18 to equal the sum of the contents of cells F10 through F17, the value for F18 is the sum of as many items as are listed on the order form. This way, the formula in F18 can be used for any number of items ordered up to eight, and need not be changed from one order form to another.

The summation formula shown in FIG. 4 is in the format used by VisiCalc®, which uses the character "@" as a flag to indicate the use of a built-in function such as "SUM". This convention has been followed by Lotus 1-2-3 and a number of other spreadsheet programs. In Excel®, an equivalent formula would be written as "=SUM(F10:F17)".

The operator "SUM" is one of a number of mathematical operators found in most spreadsheet systems. Other operators found in most prior art spreadsheet systems include trigonometric operators (such as sine, cosine, and tangent), arithmetic operators (such as square root and absolute value), logical operators (such as greater than or less than), and statistical operators (such as average and standard deviation).

Depending on the specific spreadsheet system or program used, the formula contained in cell F18, since it contains an operator, may be entered into the cell in two ways. One way is to enter the formula the same way as entering a number or text. That is, (1) select the cell, (2) type the characters "@", "S", "U", "M", "(", "F", "1", "0", " . . . ", "F", "1", "7", and ")", and (3) give an "Accept" command.

A second way is to use a built in operator menu and select the "SUM" operator from the menu. If this method is used, the steps to enter the formula of cell F18 into the cell are (a) selecting the cell; (b) selecting the operator menu; (c) choosing the "SUM" command (d) selecting the range of cells to be added and (e) giving an "Accept" command. These steps are summarized in Table 3.

TABLE 3

| Entry of the Sum of a Range of Cells into a Cell |   |
|---|---|
| 1. | Select cell. |
| 2. | Select operator menu. |
| 3. | Select "SUM" operator. |
| 4. | Select range of cells to be added. |
| 5. | Give "Accept" command. |

FIG. 5 illustrates the formula used in cell F19 to calculate the sales tax applicable to the order. Since the sales tax rate is specified to be 7.5%, the formula used is F19=F18×7.5% or "+F18*0.075". This notation is the notation that is used by VisiCalc® and Lotus 1-2-3. The notation used by other programs may be somewhat different. An equivalent formula in Excel® notation is "=F18*0.075".

FIG. 6 illustrates the formula used in cell F21 for the total amount due. The formula used is "+F18+F19", which defines the content of cell F21 as being equal to the sum of cells F18 and F19. An alternative is to use a formula of the same form as used for cell F18: "@SUM(F18 . . . F19)". Again, depending on the specific spreadsheet program, different notations may be used.

A range or block of cells is a group of contiguous cells. Prior art spreadsheet systems are typically capable of performing operations on a block of cells at a time. Typical block operations are copying, moving, replicating, formatting, extracting values for plotting on a graph, sorting, or printing. Selecting a block of cells is a common spreadsheet operation.

FIG. 7 illustrates a selected block 200 consisting of the cells in rows 10 to 15 and columns D to F. This block of cells might be selected to change the display format for the cells (currently in the "$ddd.cc" format) to move this block of data, or to copy it to another block of cells or to another file or spreadsheet.

In the example shown in FIG. 7, block 200 is selected by (1) positioning a cursor over cell D10, (2) pressing a mouse button and dragging the cursor to the diagonally opposite corner cell of the block (cell F15), and (3) releasing the mouse button. Although the precise sequence of keystrokes or mouse manipulation used to select a block in prior art spreadsheet systems may vary somewhat from spreadsheet to spreadsheet, the steps typically used are: the cell at the beginning of the block is specified, the cell at the end of the block is specified, and an appropriate block command is invoked to select a rectangular block of cells with the indicated cells at diagonally opposite corners. Table 4 lists the steps required by prior art spreadsheet systems for selecting a block of cells.

TABLE 4

| Selecting a Block of Cells |   |
|---|---|
| 1. | Specify cell at start of block. |
| 2. | Select block command. |
| 3. | Specify cell at end of block. |

As is evident from the above discussion, entry and manipulation of data in spreadsheet cells of prior art spreadsheet systems is keyboard intensive and time consuming.

SUMMARY OF THE INVENTION

The present invention provides an improved method and apparatus for entering, editing, and manipulating spreadsheet cell data. The invention overcomes the limitations of the prior art by allowing entry and manipulation of spreadsheet cell data with a minimum of manual effort.

The present invention provides for entry of untranslated handwriting directly into a spreadsheet cell. Data may be entered by writing directly in the target cell. In one embodiment, a "targeting" system is used to determine the intended target cell, allowing handwritten data to be successfully entered into the target cell even when the handwriting overlaps the target cell boundaries. The handwritten entry is automatically "scaled-to-fit" into the target cell, while the line thickness of the original writing is preserved. In another embodiment, an improved multi-tiered handwriting recognition method is used that provides handwriting recognition at high confidence levels by using separate "recognizers" for gestures, values, and text. A further embodiment adaptively varies its recognition parameters depending on the type of data entered or expected to be entered in a target cell. For instance, if a cell is a text cell, the recognition parameters are biased towards recognition of words contained in a dictionary. If the handwritten entry is not immediately recognized as a word, a number, or a mathematical formula, no translation is done, and the entry is stored as raw handwriting. No correction of un-recognized handwritten input is required, allowing uninterrupted data entry. The user may elect to keep the data in its raw form, or may, at a later time, elect to correct the entry such that a satisfactory translation is obtained. In one embodiment of the invention, if an entry is translated, both the original handwritten data and the translated data may be stored, allowing a user to "undo" a translation and revert to the original handwritten input, if desired.

In addition to improved data entry into cells, the present invention provides for improved cell editing as well. To edit the contents of a cell, the cell is first selected for editing by writing a gesture on the cell with a handheld stylus. In one embodiment, this gesture is a circle. A pop-up editing pad appears, displaying an expanded view of the cell content, which may be in the form of text, numbers, arithmetic formulas, or handwritten "ink". The cell content is preferably displayed on a character by character grid such that any character may be changed simply by writing a new character over the old character with the stylus.

The editing pad of the present invention also contains "navigation buttons". These navigation buttons allow acceptance of an entry and selection of an adjacent cell by tapping a single button. For example, to accept the entry displayed on the editing pad for the current selected cell and select the next cell to the right of the current selected cell, a button displaying a right-pointing arrow is tapped with the stylus. In one embodiment, the navigation buttons may be toggled with a "gesture navigation pad", that allows "gestures" (simple one, two or three stroke stylus entries) to be used to invoke the same commands as the navigation buttons.

In one embodiment of the present invention, the standard editing pad may be toggled with a specialized, more powerful editing pad that is customized for the type of data expected to a cell or the type of data expected to be entered in a cell. For example, if the cell contains a numerical value, the more powerful editing pad may consist of a graphical representation of a numerical keypad. Alternatively, if the cell contains an arithmetic formula, the more powerful editing pad may include a menu of components or operators, such as predefined functions, that may be used to create arithmetic formulas.

In addition to providing for improved cell entry and editing of individual cells, the present invention also provides for improved manipulation of blocks of cells. For example, double-tapping a cell automatically selects all contiguous cells from the first cell to the next "boundary" in the direction of the second tap. A "boundary" marks a transition point from one type of cell to another. For example, if the first cell contains data, the "boundary" occurs at the next empty cell. Similarly, if the first cell contains no data, the "boundary" occurs at the next non-empty cell. In addition, changes of data type between adjacent cells (such as a change from a "value" cell to a "text" cell) may be considered a boundary. A double tap may be horizontal (selecting a row of cells), vertical (selecting a column of cells), or diagonal (selecting a two-dimensional block of cells).

The present invention also provides for "restrained replication" of blocks of cells in a manner that prevents the creation of undesired cell entries. Blocks consisting of a column of cells are allowed to be replicated over a horizontal range, only, while rows of cells are allowed to be only replicated over a vertical range. Single cells, however, can be replicated in both directions, over a two-dimensional range.

The present invention provides for simplified entry of certain common arithmetic formulas. For example, to enter the sum of a group of cells into a target cell, the group of cells is selected, and a "+" sign is entered in the target cell. Similarly, to enter the product of two or more cells, the cells are selected, and a "*" is entered in the target cell.

BRIEF DESCRIPTION OF THE DRAWINGS

FIG. 1C illustrates how data is entered into the spreadsheet of FIG. 1B.

FIG. 2 illustrates an order form created by entering text labels into certain cells of the spreadsheet of FIG. 1B.

FIG. 3 illustrates the spreadsheet of FIG. 2 after customer and order data has been entered.

FIG. 4 illustrates the spreadsheet of FIG. 3 with cell F18 selected.

FIG. 5 illustrates the spreadsheet of FIG. 3 with cell F19 selected.

FIG. 6 illustrates the spreadsheet of FIG. 3 with cell F21 selected.

FIG. 7 illustrates the spreadsheet of FIG. 3 with the block consisting of cells D10 through F15 selected.

FIG. 9 illustrates the user interface of a pen based computer that may be used with the method of the present invention.

FIG. 11 illustrates a sample spreadsheet that may be used with the present invention.

FIG. 12 illustrates "ink" entries entered on the spreadsheet of FIG. 11 using the method of the present invention.

FIG. 14A illustrates the spreadsheet of FIG. 12 after the entry of cell B5 has been scaled-to-fit using the method of the present invention.

FIG. 14B illustrates a magnified section of the spreadsheet of FIG. 14A.

FIG. 18 illustrates how the "directional double tap" gesture of the present invention can be used to select a block of cells of a spreadsheet.

FIGS. 20A to 20D illustrate how different two-dimensional blocks are selected using different diagonal directional double taps using a preferred embodiment of the present invention.

FIG. 21 illustrates how a block of cells may be replicated by spreadsheets of the prior art.

FIG. 23 illustrates the spreadsheet of FIG. 18 after additional cell entries have been made.

DETAILED DESCRIPTION OF THE INVENTION

A method and apparatus for entering and manipulating spreadsheet data is described. In the following description, numerous specific details, such as microprocessor type, display type, etc., are set forth in detail in order to provide a more thorough description of the present invention. It will be apparent, however, to one skilled in the art, that the present invention may be practiced without these specific details. In other instances, well known features have not been described in detail so as not to obscure the present invention.

The present invention is preferably used with pen based computer operating systems such as PenPoint™, manufactured by GO™ Corporation of Foster City, Calif., and Microsoft Windows for Pen™ from Microsoft Corporation. However, the invention can be used with other operating systems (both pen-based and non-pen based) as well.

Pen based operating systems such as PenPoint™ provide input/output information to applications running under the operating system and provide certain functions and utilities that can be used by the applications. For example, Pen-Point™ provides certain data about stylus position and movement (such as "pen down", "pen up", "pen into proximity", "pen out of proximity", pen position, and a record of pen movement), provides certain handwriting recognition algorithms, and provides access to a number of standard commands, including certain "gestures".

Figure 1A:
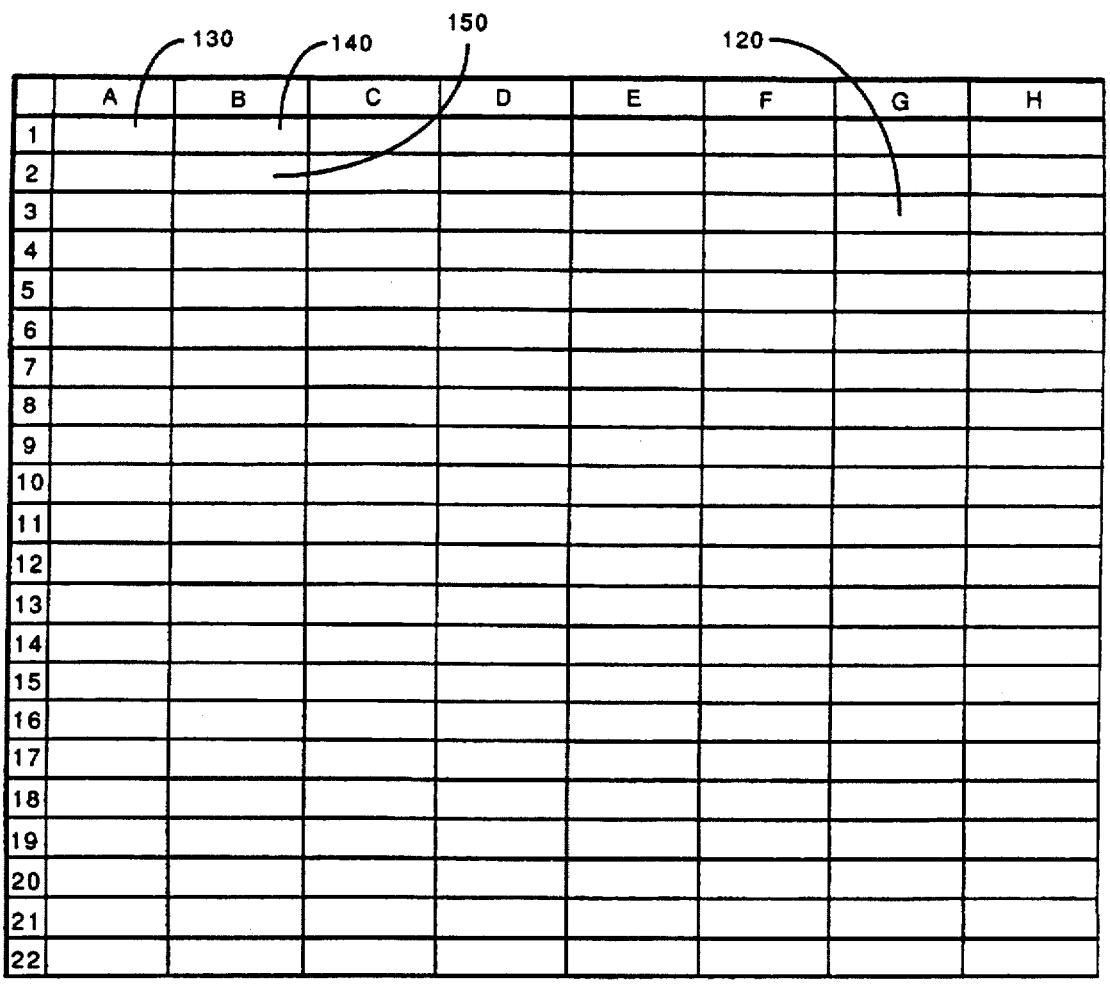
FIG. 1A illustrates a typical spreadsheet of the prior art.
Figure 1B:
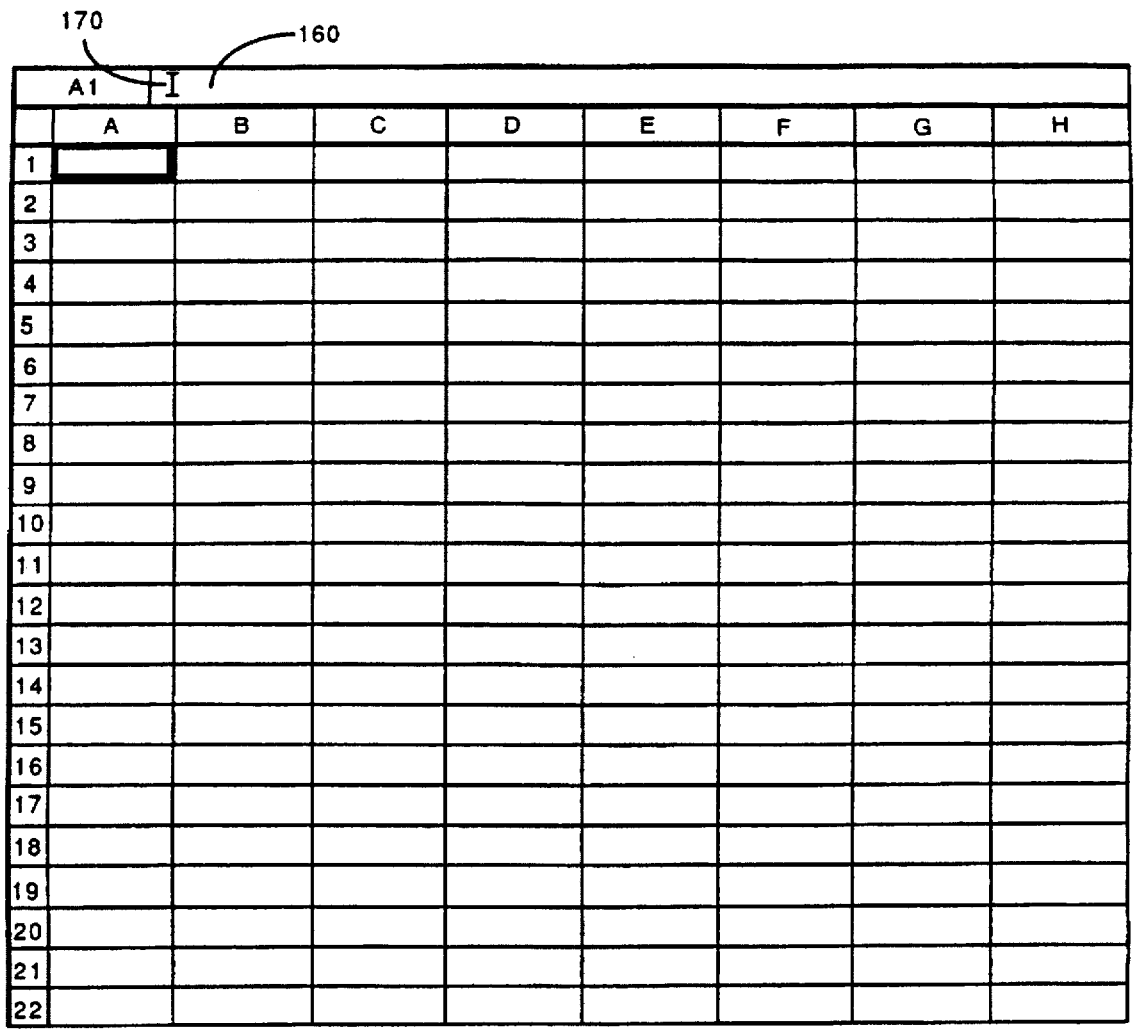
FIG. 1B illustrates a spreadsheet of the prior art including an editing bar for entry of data into a cell.
Figure 8:
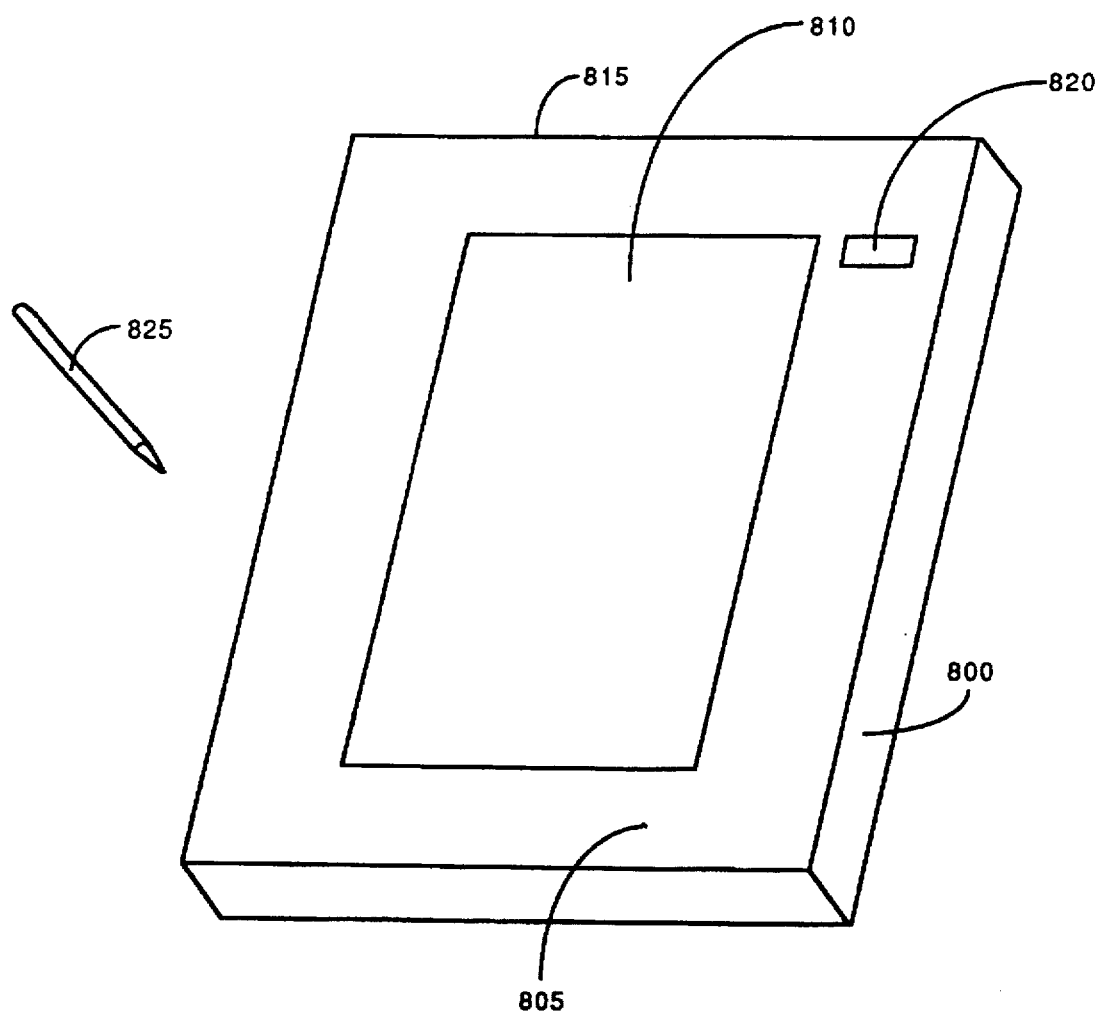
FIG. 8 illustrates a pen based computer of a type that may be used with the present invention.

FIG. 8 illustrates an example of a handwriting entry computer of a type that may be used with the present invention. It consists of a thin, flat housing 800. The front of the housing 805 features a position sensing display panel 810 and a power switch 820. Input/output ports for a disk drive, communications, and a printer, a power supply socket, and a contrast control (not visible) are located along the back side 815 of housing 805.

Position sensing display panel 810 consists of an electrostatic, position sensing surface combined with a monochrome, liquid crystal display. The display has a resolution of approximately 640 by 400 pixels. The position sensing surface senses the position of a special stylus 825 when the tip of the stylus contacts or is brought into close proximity with the surface.

The stylus may be used to write characters, "gestures", words or illustrations on the display, as well as to select and manipulate displayed items. The handling of handwritten input generally depends on the specific software application being used.

"Gestures" are pen movements (typically sequences of three strokes or less) that invoke certain specified commands. The present invention utilizes approximately a dozen standard "gestures". Examples of these "gestures" are left and right brackets ("[" and "]"), often used for selecting words or a section of text, a circle, for accessing an editing pad that can be used for data entry, single strokes or "flicks" right, left, up or down, which are used for scrolling, and "taps" or "presses" which are used to invoke commands.

For the present invention, handwritten input is preferably recorded as a series of strokes. Each stroke consists of the movement of the stylus from a "pen down" event (i.e., the stylus tip making contact with the display) to the immediately following "pen up" event (i.e., the stylus tip terminating contact with the display). FIGS. 10A–10D illustrate how data points for a stroke are recorded for one embodiment of the invention.

Figure 10A:
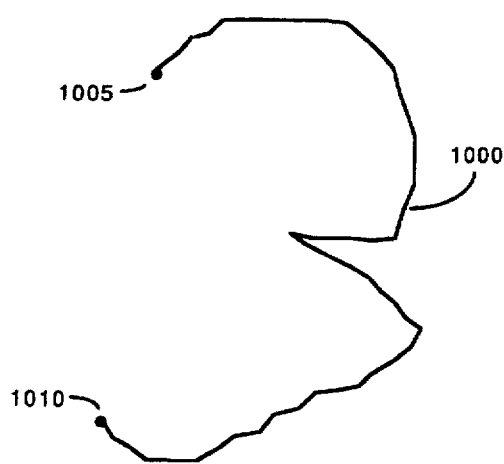
FIGS. 10A through 10D illustrate how descriptors for a handwritten character are determined.

FIG. 10A is an enlarged view of a handwritten stroke 1000 that represents the FIG. "3". The beginning point of stroke 1000, that is the point where the stylus first makes contact with the display, is at point 1005. The end point of stroke 1000, that is the point where the stylus is lifted from the display, is at point 1010.

The display is continually sampled at a rapid rate, (in one embodiment, approximately 200 times per second), to determine whether the stylus is contacting the display, and, if so, the coordinates of the point of contact.

Figure 10B:
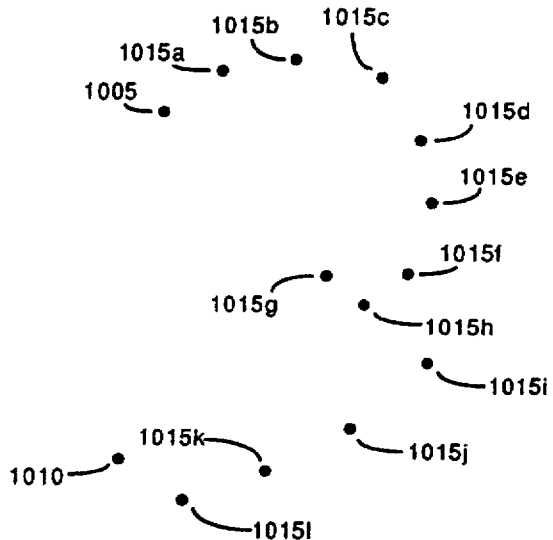

The stroke recording process begins when the tip of the stylus makes contact with the display. A "pen down" event is recorded, and the coordinates of the contact point are stored. At each succeeding sampling interval, the new position of the stylus is determined. FIG. 10B illustrates the positions 1015a to 1015l of the stylus for each sampling interval between the "pen down" event at point 1005 and the "pen up" event at point 1010.

Figure 10C:
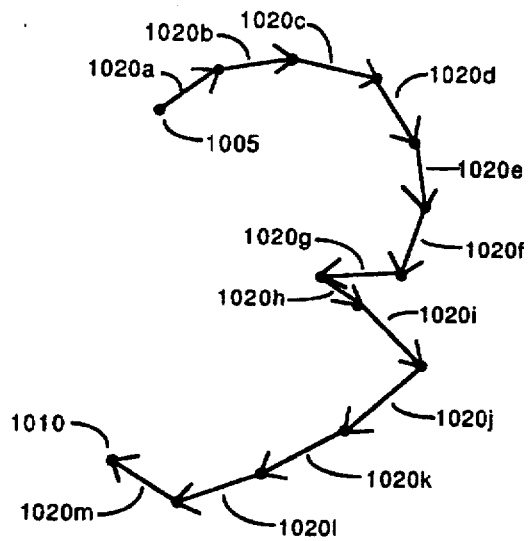

Although it is possible to describe stroke 1000 in terms of the coordinates of "pen down" point 1005, intermediate positions 1015a to 1015l, and "pen up" point 1010, it is preferable to describe a stroke in terms of the relative change in position, or "delta", from each sampled position to the succeeding one. FIG. 10C illustrates stroke 1000 in terms of "pen down" point 1005 and "deltas" 1020a to 1020m. The "delta's" are recorded as relative changes in horizontal ("x") and vertical ("y") positions, respectively.

Figure 10D:
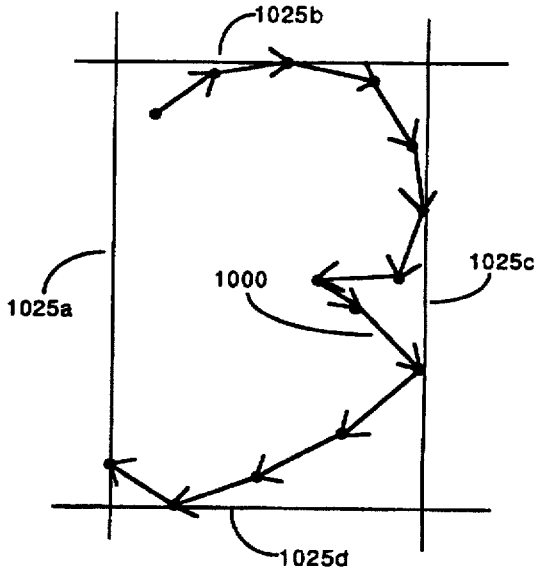

An additional piece of information about a stroke that may be recorded is the stroke's "bounds", shown in FIG. 10D. The "bounds" of a stroke are the maximum limits reached by the stroke in the horizontal and vertical directions. These limits are designated items 1025a through 1025d in FIG. 10D.

Handwritten input to the computer usually does not consist of a single stroke. Instead, handwriting generally consists of letters, numbers or words made up of groups of separate strokes. Strokes that are part of the same handwritten entry typically are closely spaced both in time and in position. In the present invention, if the "pen down" event of a subsequent stroke occurs within approximately 500 milliseconds (the exact interval is user selectable) of the "pen up" event of the preceding stroke, the subsequent stroke is considered to be part of the same handwritten entry as the preceding stroke. The same is true if the second stroke is made without the stylus being brought out of proximity with, or raised more than approximately one-half inch above, the display screen between the "pen up" event of the first stroke and the "pen down" event of the second stroke.

In addition to or instead of the stroke description method described above, other forms of handwritten stroke descriptions may be used. Furthermore, depending on the specific embodiment of the invention, input means other than a handheld stylus may be used to provide input to the invention. For example, input produced by a keyboard, a mouse, a mouse-pen, a light pen, a finger (in conjunction with a touch sensitive panel), a scanner, a video digitizer, or a digitizing pad may be used.

Ink-in-Cell

One feature of the present invention is the use of untranslated handwriting ("ink") as data that can be entered into spreadsheet cells. This feature allows the input of handwritten data into cells of a spreadsheet without the delay normally produced by handwriting recognition and translation processes. It also allows freestyle handwritten graphical elements and symbols for which translations do not exist to be entered into a cell. FIGS. 11 to 14 illustrate how handwriting, or "ink", can be entered into spreadsheet cells using the present invention.

FIG. 11 illustrates a spreadsheet in the form of a customer order form. The spreadsheet of FIG. 11 is similar to the spreadsheet shown in FIG. 2.

FIGS. 12 through 14 illustrate how "ink" entries may be entered into spreadsheet cells with the present invention. Comparisons will be made, where appropriate, to the corresponding entry procedures used in the prior art spreadsheets described with respect to FIGS. 2 through 7 above.

In this example, the spreadsheet of FIG. 11 may be used by a salesperson in the field during sales calls to record and document customers' orders. To take an order, the salesperson enters into the cells of the spreadsheet the invoice number, order date, delivery date, type, size, cost and quantity of goods ordered. The salesperson then uses arithmetic spreadsheet operators and functions to calculate the subtotals and total amount of the goods ordered.

Using entries identical to those used in FIG. 3, the first item entered into the spreadsheet of FIG. 11 is the Invoice No. "1234", which is to be entered in cell B3. To enter this number into cell B3 of the prior art spreadsheet shown in FIG. 3, it will be recalled that the three-step process listed on Table 1, or the five-step process listed on Table 2, is used. In the present invention, however, a simple one step process is used: the number "1234" is simply handwritten on cell B3, as shown in FIG. 12.

The present invention, in one embodiment, records this handwritten entry as follows. The recording sequence is initiated when the operating system of the computer reports that a handwritten entry, consisting of a stroke, or a group of strokes, is made on a cell. The present invention collects "descriptors", namely the "pen down" event, "pen down" coordinates, "pen up" event, "pen up" coordinates, intervening "deltas", and stroke bounds for each stroke forming part of an entry. The present invention compiles, preferably in sequential fashion, the stroke descriptors for each of these strokes, adds an identifier identifying the data as "ink", and stores this data as the entry for the cell. The stored stroke descriptors are translated into a display bitmap, which is displayed on the display as the contents of the cell.

Table 5 summarizes the procedure for input into a spreadsheet cell using the present invention.

TABLE 5

Data Entry into Spreadsheet Cell
Using the Present Invention

| | |
|---|---|
| 1. | Write entry in cell. |

In one embodiment of the invention, a spreadsheet cell may contain both machine readable data as well as handwritten or other graphic data. The machine readable data may be stored in a first memory location and the graphic data at a second memory location, such that each may be separately entered and/or edited. Each type of data may be separately displayed, or the data may be displayed concurrently, with one type of data superimposed, if necessary, on the other type of data.

In some embodiments of the present invention, strokes need not be made only within the bounds of a cell in order to be recognized as an entry for a particular cell. In certain instances, a displayed cell has small dimensions that make it difficult to fit a handwritten entry into the cell. In addition, even with a larger cell, handwritten entries can be made more quickly if the handwriting does not need to fall entirely within the target cell's boundaries. These embodiments of the present invention use a technique called "targeting" to identify and properly place an entry that crosses cell boundaries into the intended target cell. Various "targeting" techniques are described in detail in U.S. patent application Ser. No. 08/561,978 entitled "Input Device With Data Targeting", and assigned to the assignee of the present invention. The "Input Device With Data Targeting" patent application is incorporated herein by reference.

"Targeting" as used in one embodiment of the present invention is described with respect to the entry "Acme Sales" for cell B5 of the spreadsheet of FIG. 12. As shown in FIG. 12, the handwritten entry "Acme Sales", intended for cell B5, extends beyond the borders of cell B5 into portions of cells A4, A5, A6, B4, B6, C4, C5 and C6.

Figure 13A:
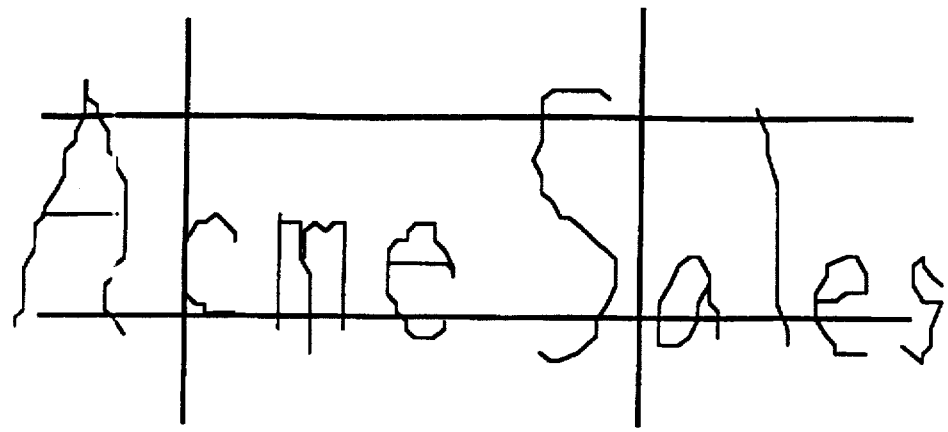
FIGS. 13A through 13H illustrate how a handwritten entry is targeted and scaled to fit using the method of the present invention.
Figure 13B:
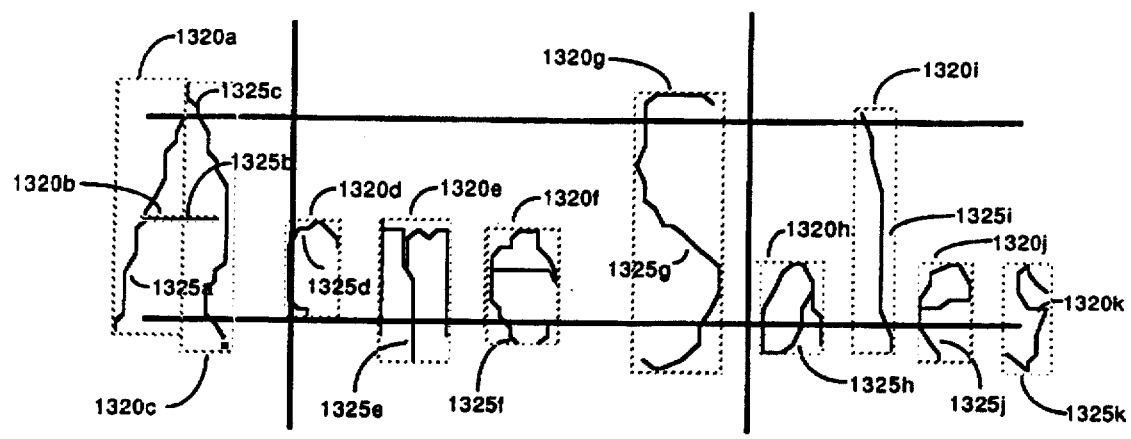
Figure 13C:
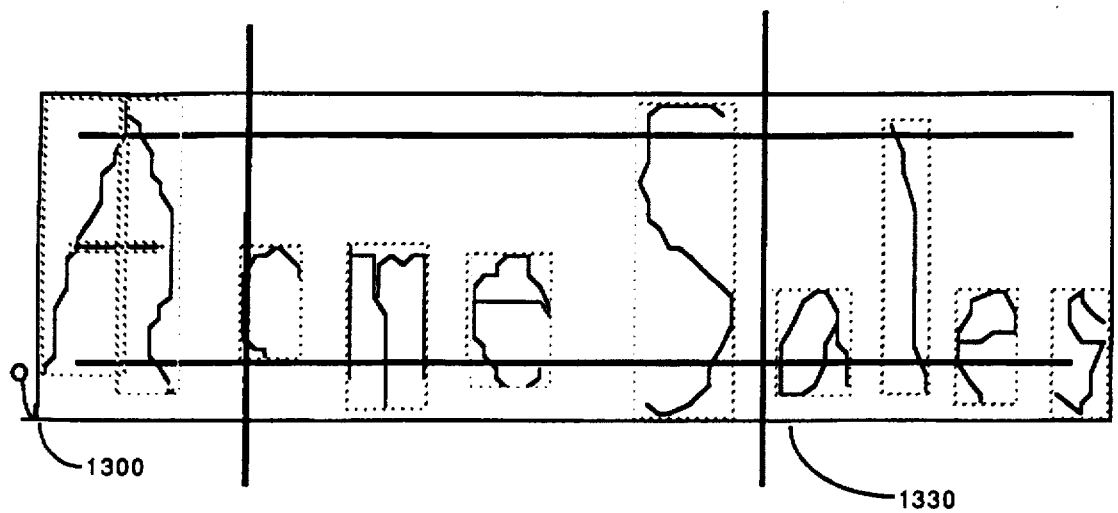

A magnified view of cell B5 and the handwritten "Acme Sales" entry is shown in FIG. 13A. To determine into which cell an entry is intended to go, according to this embodiment of the present invention, the "bounds" of the entry are first determined. As discussed above, in one embodiment of the invention, the "bounds" of each stroke of an entry are provided by the computer's operating system. Alternatively, the bounds may be calculated from other stroke descriptors. FIG. 13B illustrates the bounds 1320a through 1320k of each of the strokes 1325a through 1325k, respectively, that make up the characters for the entry "Acme Sales". From the bounds of each stroke of the entry, the bounds of the entire entry are determined. The bounds 1330 of the "Acme Sales" entry are shown in FIG. 13C.

Figure 13D:
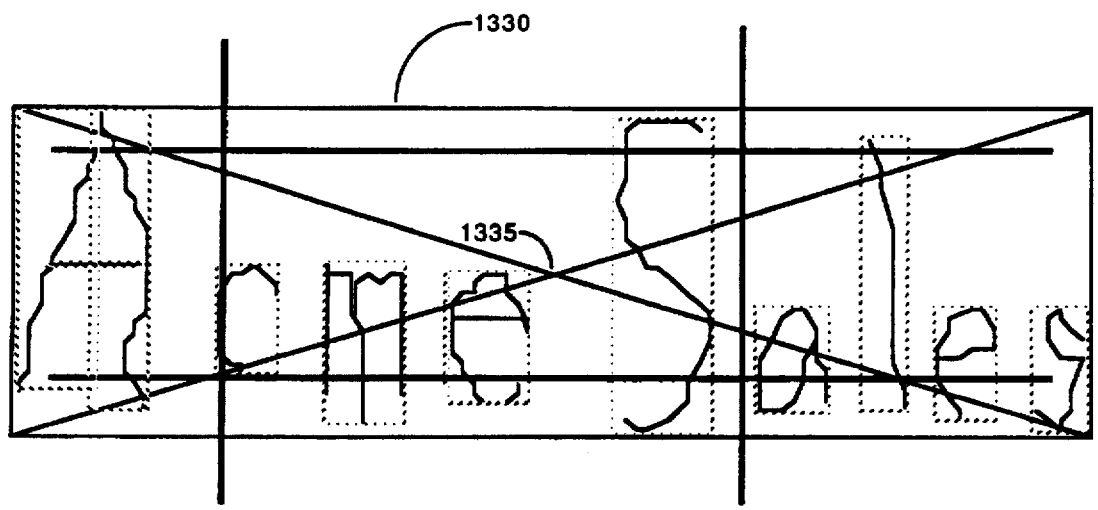

As shown in FIG. 13D, the center of area of the bounds of "Acme Sales" is then determined. The center of area of the bounds 1330 is designated item 1335. The position of this center of area 1335 determines which cell is designated the target cell. In the example shown in FIG. 13D, the center of area 1335 is located within the boundaries of cell B5. Accordingly, cell B5 is identified as the intended target cell for the "Acme Sales" entry.

Although this embodiment of the present invention uses the center of area of the rectangular bounds of the entry as the reference point that determines the target cell, other reference points may be used. For instance, the reference point may be biased somewhat towards the left-most bound of an entry under the assumption that the beginning of an entry will be located closer to the beginning of a cell than the end of the entry is to the end of the cell. For instance, the "A" of the entry "Acme Sales" as shown in FIG. 13A does not extend as far beyond the left boundary of cell B5 as the last "s" extends beyond the right boundary of cell B5. Such biasing may be accomplished, for example, by defining the reference point to be located ⁴⁄₁₀ths of the way from the left bound to the right bound of the entry. The reference point may also be determined by more complex methods. For example, a different formula may be used to determine the reference point of a long entry than of a short entry. Any of the other methods described in the "Targeting" patent application referred to above may also be used.

After the target cell for an entry is identified, the present invention rescales the dimensions of the entry so as to fit into the target cell. First, the lower left hand corner of the rectangular box defined by the bounds of an entry is designated a local origin "O". For the entry "Acme Sales" shown in FIG. 13C, this local origin "O" is labeled item 1300. The coordinates of the "pen down" point for each stroke comprising the entry are then converted into relative x and y coordinates relative to the local origin "O". Since the "deltas" are preferably already specified in terms of relative position from a preceding point, no conversion of the "deltas" is normally required.

Next, the appropriate scaling factor is determined. This is done by comparing the vertical and/or horizontal dimensions of the rectangular box defined by the bounds of an entry to the vertical and horizontal display dimensions of the target cell.

Figure 13E:
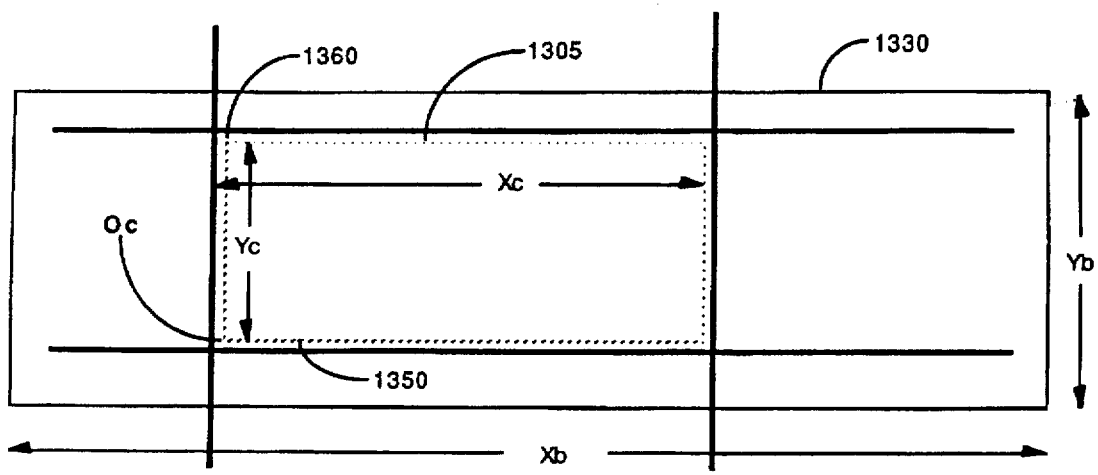

FIG. 13E illustrates the x and y dimensions for bounds 1330 of the entry "Acme Sales" and for the display area 1350 of cell B5 (designated item 1305). "Xb" is the horizontal dimension of bounds 1330. "Yb" is the vertical dimension of bounds 1330. "Xc" and "Yc" are the corresponding horizontal and vertical dimensions, respectively, of the display area 1350 of cell 1305. Display area 1350 is slightly smaller than the boundaries of cell 1305 to provide some clearance between the content of the cell, when it has been scaled to fit the cell, and the boundaries of the cell itself.

The factor used to scale the entry depends on the type of scaling desired.

The factor by which the size of the entry must be reduced in order for it to fit entirely within the target cell is the smallest of the two ratios Yc/Yb and Xc/Xb.

The factor by which the size of the entry must be reduced in order for the entry to fit within the vertical bounds of the target cell is the ratio Yc/Yb.

Accordingly, to scale the entry to fit entirely within the target cell, ratios Yc/Yb and Xc/Xb are calculated. The smallest is selected as the scaling factor for the entry. To scale the entry to fit within the vertical bounds of the target cell, but not necessarily the horizontal bounds the scaling factor is simply Yc/Yb.

The appropriate scaling factor may be stored as an attribute of the entry in addition to the original descriptors, or the scaling factor may be combined with the original descriptors to produce scaled descriptors that are stored in memory. In one embodiment of the invention, the scaled descriptors are converted to a unit of measure that is relative to the height of the row in which the target cell is located.

Figure 13F:
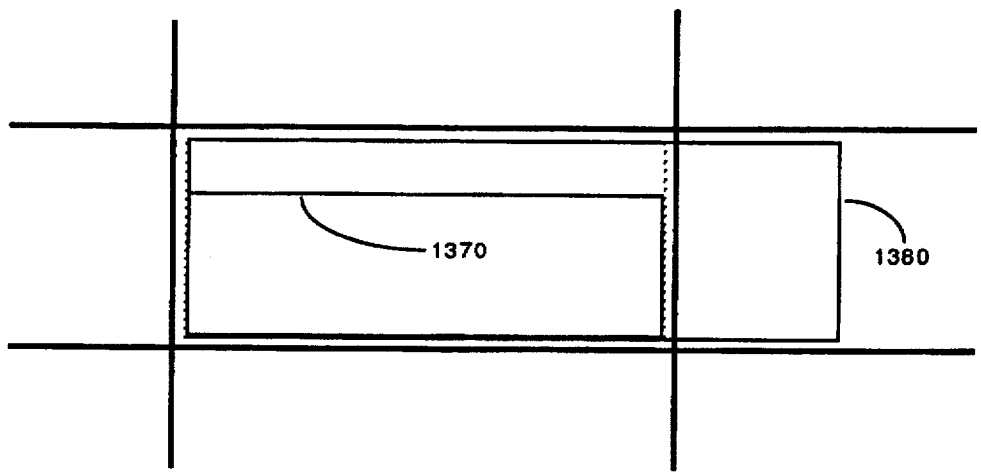

Scaling the "pen down" coordinates and each of the horizontal and vertical components of an entry in the manner described reduces the bounds of the entry from their original size 1330 shown in FIG. 13E to the reduced, scaled size 1370 (to fit entirely in the target cell) or 1380 (to fit within the vertical bounds of the target cell) as shown in FIG. 13F.

The scaled strokes are then displayed by using the lower left hand corner 1360 of the display area 1350 of FIG. 13E as the origin Oc for the scaled entry, and plotting the position of each scaled "pen down" point and each line segment representing each scaled delta on the display screen using a predetermined line thickness. In one embodiment, a line thickness of one pixel is used. In another embodiment, the line thickness is user selectable. Preferably, the same line thickness is used that is used to display the original, unscaled entry as it is entered by the stylus. The line thickness is thereby preserved when the entry is scaled, enhancing the appearance of the scaled entry on the display.

Figure 13G:
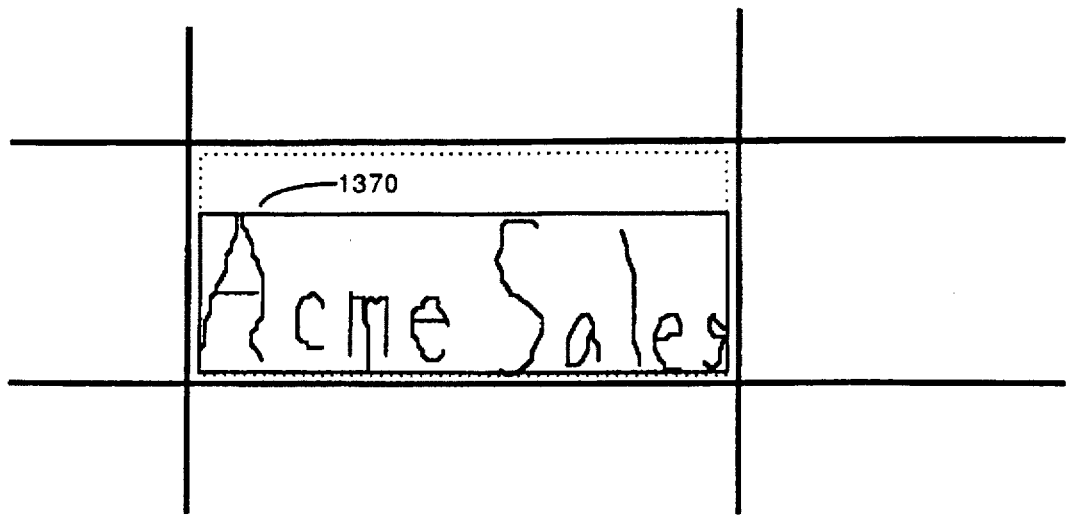
Figure 13H:
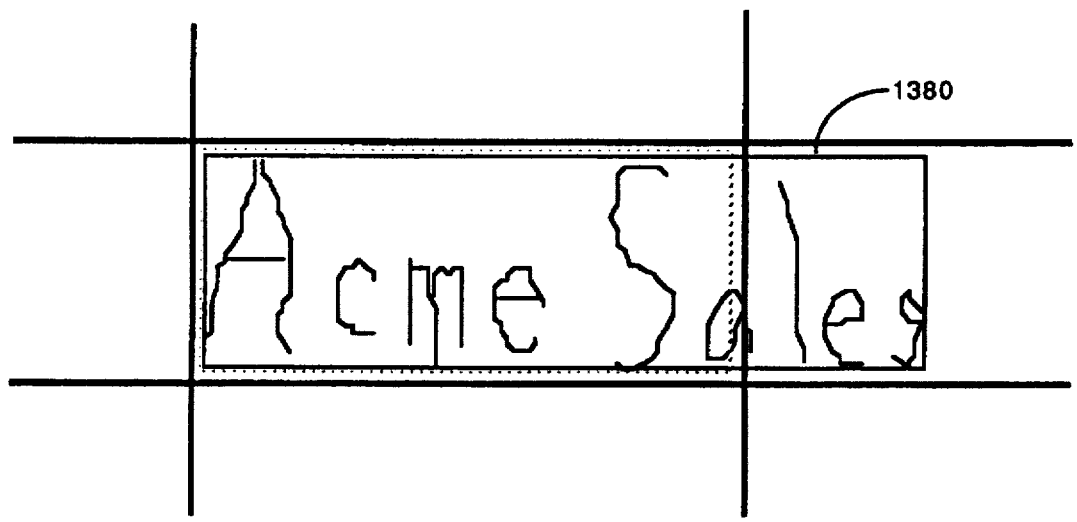

The resulting reduced entries are shown in FIGS. 13G and 13H. The steps used by the present invention to scale a handwritten entry are summarized in Table 6.

TABLE 6

| Scaling a Handwritten Entry | |
|---|---|
| 1. | Enter Data into Cell. |
| 2. | Determine scale factor. |
| 3. | Multiply descriptors by scale factor. |
| 4. | Display scaled descriptors. |

The same scaling factor is used for both x values and y values to preserve the aspect ratio of the original entry. Alternatively, different values for the scaling factor for x values and for y values may be used. For example, the ratio Yc/Yb may be used for y values, and the ratio Xc/Xb for x values. If these ratios are used, the scaled entry has the maximum possible size that will fit in the cell display area. However, the entry's aspect ratio will not be preserved.

The scaling method of the present invention described above may be used to enlarge undersized entries to fit the display area of a cell as well as to reduce oversized entries.

The ability to store spreadsheet cell entries in the form of ink provides a number of advantages over the prior art. One benefit is that handwritten input need not be translated into machine-readable form immediately after input. Instead, it can be stored as "ink". If translation into machine-readable form is required, such translation may be delayed, or "deferred", until a convenient time. Real-time handwritten data entry is therefore not delayed by the translation process. In addition, providing for "ink" to be used as a form of spreadsheet cell data allows handwritten notations, sketches, signatures and other graphic elements to be entered as data into individual spreadsheet cells.

Certain embodiments of the present invention also provide for enlargement and reduction, or "zooming" of the scale at which the spreadsheet is displayed on a computer display screen. The scale may be zoomed incrementally by activating a zoom command (for example by means of an "up arrow" gesture for magnifying the display or a "down arrow" gesture for reducing the scale of the display), by choosing the desired magnification or reduction scale from a pop-up menu, or by other appropriate means. Magnifying the scale of the display facilitates entry and targeting of long spreadsheet cell entries. Reducing the scale gives a better overview of the spreadsheet as a whole.

FIGS. 14A and 14B demonstrate how the "zooming" feature of the present invention may be used to magnify the scale at which the spreadsheet is displayed. FIG. 14A shows a spreadsheet displayed at a predetermined normal or default display or magnification level. In one embodiment of the invention, relative magnification factors are assigned to the various magnification levels. The default magnification level, which in certain embodiments may be set by the user, may be given a nominal relative magnification factor of "1". Using this convention, magnified and reduced display levels will have relative magnification factors greater than 1 and less than 1, respectively. There is generally no limit to the range of magnification levels that can be used.

FIG. 14B shows the spreadsheet of FIG. 14A magnified by a factor of approximately 1.7. At this magnification, only the portion of the spreadsheet of FIG. 14A within the dashed rectangle 1410 in FIG. 14A is displayed on the screen.

As can be seen by comparing FIGS. 14A and 14B, all of the features shown within rectangle 1410 in FIG. 14A, with exception of the "ink" entries in cells B3 and B5, are shown in FIG. 14B in true magnified form: letters and numbers are 1.7 times as high, wide, and thick, cells are 1.7 times as long and as high, and grid lines are 1.7 times as thick, as the corresponding items in FIG. 14A.

The "ink" entries, however, are treated somewhat differently. Although they are scaled in height and width the same as other features, their line thickness preferably remains unchanged.

Keeping the line thickness constant regardless of the amount by which an "ink" entry is magnified or reduced provides a consistent appearance to handwritten entries regardless of the zoom level at which different entries are entered, and optimizes the amount of visual information provided to the user. At higher magnifications (as shown in FIG. 14B), the increased size of a handwritten entry without an increased line thickness provides a crisper, more precise view of the handwritten entry. At lower magnifications (as shown in FIG. 14A), keeping the line thickness constant preserves the main visual features of the "ink" entry as its size is reduced.

The method used by one embodiment of the present invention to scale "ink" entries during "zooming" is similar to the method used for scaling an "ink" entry to fit a spreadsheet cell, discussed above.

As described above, in one embodiment of the invention, when an "ink" entry is scaled to fit a cell, a scale factor is calculated and stored in memory together with the descriptors of the entry. This scale factor is used to calculate the appropriate display bitmap for displaying the scaled-to-fit entry on the display screen. For example, if the scaled-to-fit size of the entry is 75% of its original size, the scale factor is 0.75. In one embodiment, the original descriptors of the entry are multiplied by the scale factor and the resulting scaled descriptors are stored as data content of the target cell. In another embodiment, the original descriptors are retained as the data content of the target cell and the scale factor is stored as an additional descriptor of the entry. Retaining the descriptors in their original form insures that none of the original input data is lost as a result of rounding or other errors. The stored scale factor is applied to the stroke descriptors when the content of the cell is to be displayed.

For an embodiment of the spreadsheet of the present invention that features multiple display magnification or "zoom" levels, the display level at which the "ink" is entered in the cell must be taken into account in determining the descriptors of the entry that are stored as the data content of the target cell.

One method that may be used is to store the relative magnification factor of the zoom level at which the "ink" is entered as an additional descriptor in the same manner as the scale factor for an entry that is scaled to fit a cell. For example, if the "ink" entry above was entered at a zoom level having a magnification factor of 2.0, "2.0" would be stored as an additional descriptor of the entry. The descriptors of the entry would therefore include the original stroke descriptors, the "scaled to fit" scale factor of "0.75", and the zoom level relative magnification factor of "2.0". In one embodiment of the invention, the scale factor and the magnification factor are combined and stored as a combined scale factor equal to the ratio of the scale factor divided by the relative magnification factor. In another embodiment, the original descriptors are adjusted by the scale and relative magnification factors and the so adjusted descriptors are stored as data content of the target cell.

The present invention allows handwritten data to be entered into the same spreadsheet cell at different magnification levels. A cell may accordingly contain sets of descriptors entered at different magnification levels. Each such set of descriptors includes an identifier indicating the magnification level at which the handwritten data represented by that set of descriptors was entered. In the example described in the previous paragraph, a first entry is made at a first magnification level having a magnification factor of "2.0". Accordingly, the relative magnification factor "2.0" is stored with the set of descriptors of this first entry. If a second "ink" entry is added to this same spreadsheet cell at a different "zoom" level, for example at a magnification level of "1.5", the relative magnification factor of "1.5" is stored with the set of descriptors for this second entry. To display an "ink" entry that has been stored in memory as a series of descriptors plus a scale factor and a relative magnification factor, the relative magnification factor of the display level at which the entry is being displayed is multiplied by the scale factor and divided by the relative magnification factor for the level at which the entry was entered. For example, if the entry described above is being displayed at a magnification level having a relative magnification factor of 4.0, the resulting display factor would be (4.0×0.75)/2.0 or 1.5. This combined factor is applied to the original stroke descriptors to produce adjusted descriptors used to display the entry. If the "ink" entry consists of different sets of descriptors and scale factors and relative magnification factors that were entered at different magnification levels (or that were entered at the same magnification level but at different times), these adjusted descriptors are determined for each such set of original descriptors. The adjusted descriptors, which preferably include the positional coordinates of line segments making up each stroke of the entry, are translated into bitmapped lines that are displayed on the screen. In one embodiment, a constant thickness of one pixel is used for the bitmapped lines, regardless of the relative magnification factor of the display level or of the magnification level or levels at which "ink" data was entered in the cell. However, other line thicknesses, including line thicknesses that are proportional to the magnification factor of a display level, may be used.

Figure 25:
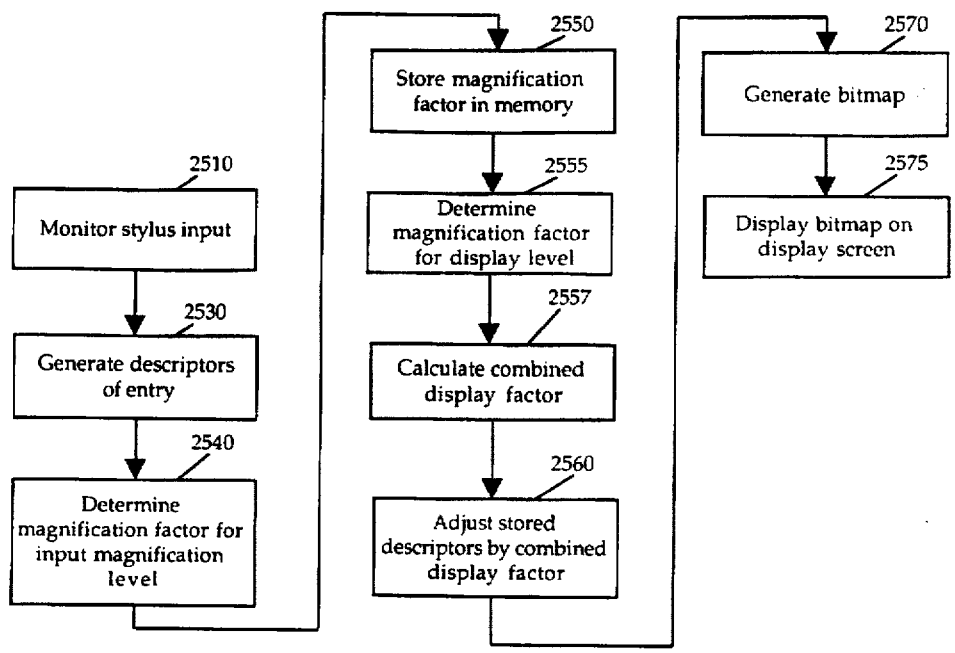
FIG. 25 illustrates a flow chart for one embodiment of the "zooming" feature of the present invention.

FIG. 25 is a flow chart for the embodiment of the "zooming" system of the present invention described above.

Stylus input is monitored at block 2510 and descriptors of the strokes making up the entry are generated at block 2530. The magnification factor for the magnification level at which the strokes were entered is identified at block 2540. This input magnification factor is stored in memory at block 2550 together with the stroke descriptors of the entry.

To display the target cell content at an arbitrary display magnification level, the relative magnification factor for the output display level is determined at block 2555. The combined display factor (consisting of the ratio of the output relative magnification factor divided by the stored input relative magnification factor, multiplied by the scaled to fit scale factor, if any) is calculated at block 2557, and the descriptors are adjusted correspondingly at block 2560. The adjusted descriptors are converted into a display bitmap at block 2570, and the resultant bitmap is displayed on a display screen at block 2575.

In another embodiment of the invention, instead of storing magnification factors with the stroke descriptors, the descriptors are adjusted for display at different magnification levels by comparing a reference measurement (such as the area of the cell) at the magnification level at which the entry was originally entered to the corresponding measurement at the magnification level at which the entry is being displayed. For example, if the area of a cell at the magnification level at which an entry was entered was originally 2 units, and the area of that cell is 4 units at a level at which it is being displayed, the original descriptors are adjusted by a factor of 4 units divided by 2 units, or 2, for display at the new level.

The same general method may be used with other reference measurements. For example, instead of the area of the cell, its height or width, or the area, height, or width of the bounds of the original entry, may be used. In each case, the magnitude of the reference measurement at the magnification level at which an entry was entered is compared to the magnitude of the reference measurement at the magnification level at which it is displayed, and an appropriate adjustment factor is calculated from the ratio between the two.

In another embodiment, the original descriptors for an entry are converted to units of measurement relative to the reference measurement, and the relative values of the descriptors are stored as data content of the cell. For example, the height of the target cell may be used as the reference measurement. If the height of the target cell at the display level at which a stroke is being entered is 0.5 inches and one of the descriptors is a vector having a length of 0.4 inches, this descriptor would be stored in memory as a vector having a length of 0.4/0.5, or 0.8, relative to the height of the cell. To display an entry that has been stored in the form of relative descriptors based on the height of the target cell on the display screen at any magnification level, these relative descriptors are multiplied by the new height of the cell at the new magnification level to obtain adjusted descriptor values, which are then converted to a bitmap for display on the screen. When the display magnification level changes, only the new magnitude of the reference measurement need be determined. Since the descriptors are stored as values relative to the reference measurement, they change automatically when the reference measurement changes.

Figure 24:
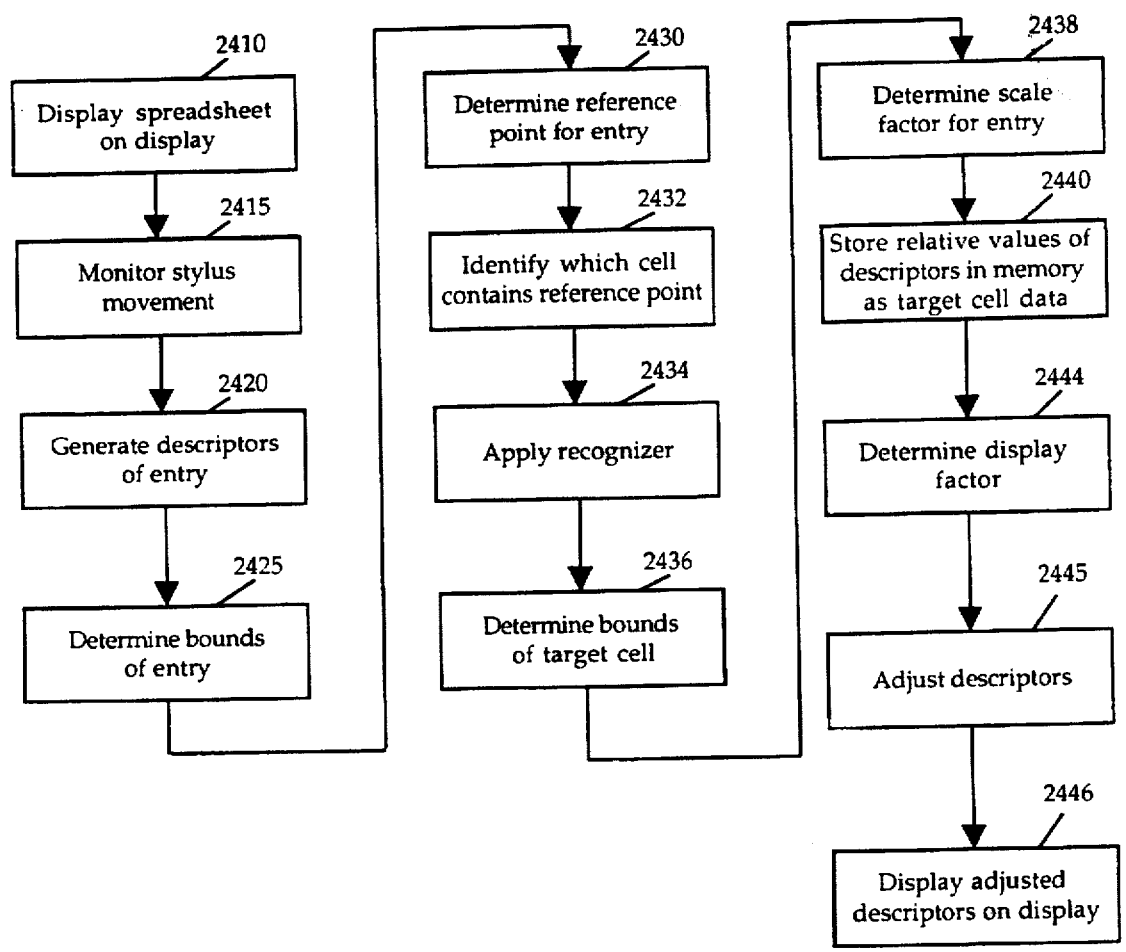
FIG. 24 illustrates a flow chart for one embodiment of the data entry system of the present invention.

FIG. 24 is a flow chart of the process steps involved in entering data as "ink" into a spreadsheet cell using one embodiment of the present invention.

The spreadsheet is displayed on the display screen at block 2410 in FIG. 24, and stylus movement during entry of handwritten input is monitored at block 2415. Descriptors of the handwritten entry are generated at block 2420, and the bounds of the entry are determined at block 2425. To determine the target cell, a reference point within the block is determined at block 2430, and the spreadsheet cell in which the reference point falls is identified at block 2432 (other targeting methods, for example the methods disclosed in the "Targeting" patent application referred to above, may instead be used). The multi-tiered handwriting recognition system of the present invention, described in detail below, is applied at block 2434. It is assumed for this illustration that the recognizer does not produce a valid translation, such that the entry will be stored in "ink" form.

After the recognition system determines that the entry is to be stored in ink form, the bounds of the target cell are determined at block 2436 and the scale factor for scaling the entry to fit the target cell is calculated at block 2438. This scale factor, together with the original stroke descriptors, are stored in memory as the data content of the target cell at block 2440. To display the entry, a combined display factor (the scale to fit scale factor multiplied by the ratio of the magnitude of the reference measurement at the display magnification level to its magnitude at the input magnification level) is determined at block 2444. The original descriptors are adjusted by the display factor at block 2445, and the adjusted descriptors are displayed on the display screen at block 2446.

It should be noted that the steps shown in FIG. 24 are by way of example, only. Other embodiments may contain additional or fewer block operations than shown in FIG. 24, the individual block operations may operate differently than described above, and the order in which the operations are performed may vary from one embodiment of the invention to another. The same is true for the block diagrams and flow charts shown in FIGS. 15A, 15B, 15C, 25 and 26.

Multi-tiered Character Recognition

In addition to providing a way to store handwritten spreadsheet cell entries (in the form of untranslated "ink"), the invention also provides a method for handwriting recognition.

In prior art handwriting recognition methods and systems, a description, or "template" for a predefined set of characters (each of which may be single characters such as a letter or digit or groups of two or more letters or digits that are commonly found in combination, such as "th") is defined and stored in memory. Handwritten entries are compared to the stored templates. The entries may be compared either on a character by character basis (if the separate characters making up the handwritten entry are easily identifiable, as for example if each character is entered separately in a designated entry area) or the entry may be looked at as a whole (if there is no clear separation into individual characters). If the entire entry as a whole is sent through the handwriting recognition system, the system must determine where one character ends and the next one begins, in addition to recognizing and translating the individual characters.

Because handwriting by nature is not precise, most of the time a handwritten character will only imperfectly match the corresponding template. To determine how well a handwritten entry matches a template, or a series of templates if the entry is made up of a string of characters (one or more templates or characters from a set of templates or characters being referred to herein as a "subset" of templates or characters), "match coefficients", also referred to as "confidence levels", are calculated. The subset of templates producing the highest confidence level is identified. The characters represented by these templates provide the "best fit" translation of the handwritten entry. If the confidence level for this "best fit" translation exceeds a predetermined minimum threshold, the "best fit" translation is adopted. If the confidence level for the "best fit" translation is less than the minimum threshold value, no translation is done. In some prior art recognition systems, if the confidence levels for only certain parts or individual characters of the entry exceed the minimum required confidence level, only those parts or characters are displayed in translated form. A question mark or other character is displayed for each unrecognized character or part. In other prior art recognition systems, a "tree" of possible solutions, with the confidence levels for each, may be provided.

In prior art handwriting recognition systems, if all or a part of a handwritten entry cannot be translated, the unrecognized part typically must be re-entered or is abandoned.

The handwriting translation method of the present invention provides for fewer failed and incorrect translations than recognition systems of the prior art, and does not require immediate reentry of unrecognized characters. This is accomplished by using a multi-tiered constrained handwriting recognition process that improves the likelihood of a correct translation by limiting the types of acceptable translations. In one embodiment, recognition is further improved by varying the recognition process to correspond to the type of data expected to be entered.

In certain embodiments of the present invention, a handwritten entry can represent one of four types of data input: (1) a "gesture", (2) a "value", namely a number or formula, (3) text, or (4) "ink". In other embodiments, other data types, for example Greek or mathematical symbols, may be used.

One embodiment of the present invention, rather than using a single data set consisting of templates for all recognizable characters, instead divides the templates into groups. In this embodiment, the templates are divided into three groups, or "recognizers": one for gestures (the "gesture recognizer"), one for numbers and arithmetic operators (the "value recognizer"), and one for text characters (the "text recognizer"). As described below, a handwritten entry is sent, in turn or in parallel, through one or more of these recognizers.

In one embodiment, the gesture recognizer is applied first, then the value recognizer, and finally the text recognizer. In certain other embodiments, the order in which the recognizers are applied may be varied according to the type of data expected to be entered. In another embodiment, the entry is sent in parallel through each of the recognizers simultaneously. In this embodiment, the results of the different recognizers are available simultaneously. These results are then tested to see whether they meet predetermined minimum recognition criteria. The results may be tested simultaneously or in sequence. In one embodiment different minimum match criteria may be used for each recognizer, depending on the type of data that is being entered or that is expected to be entered into the target cell. In other embodiments, the same match criteria is used for all recognizers.

If all recognizers have been applied, but no satisfactory match has been made between the handwritten entry and any appropriate subset of the templates applied by each recognizer, the entry is stored as "ink". If the user desires to do so, the entry may in some embodiments later be selected for correction and renewed translation. In many instances, however, the entry will be satisfactory to the user in its original "ink" form, and need never be translated.

The entries in cells B3 and B5 of FIG. 14 provide examples for describing an embodiment of the multi-tiered recognition/deferred translation process of the present invention.

As mentioned above, the cells of the spreadsheet of FIG. 14 may contain one of three types of data: text, numbers, or "ink". In certain embodiments of the invention, cells may be pre-designated for receiving a particular data type. For example, the cell may be designated to be a "text" cell, a "value" cell, an "ink" cell. In certain embodiments, only data of the predesignated type may be entered into the cell. In other embodiments of the present invention, designating a cell a particular type does not preclude data of a different type from being entered into the cell. Such a designation does, however, indicate what kind of data is likely to be entered into the cell, thereby aiding the handwriting recognition process.

In the spreadsheet of FIG. 14, cell B3 is the cell into which an invoice number is to be entered. Cell B3 therefore may be designated a "value" cell. In cell B5, on the other hand, the customer name is to be entered. Cell B5 is therefore may be designated a "text" cell.

One embodiment of the multi-tiered handwriting recognition method of the present invention provides for changing the order in which the handwriting recognizers are applied based on the designated data type for the target cell. The recognizer for the anticipated type of cell data may be used to translate the input data before the recognizers for certain other data types. In addition, less restrictive match criteria may be used for the recognizer for the anticipated data type.

For example, assume that cell B3 of the spreadsheet of FIG. 14 has been designated as a "value" cell. Using one embodiment of the handwriting recognition method of the present invention, the handwritten entry in cell B3 (consisting of the handwritten characters "1", "2", "3" and "4" as shown in FIG. 14) is first sent through the "gesture recognizer". The "gesture recognizer" is used first because gesture commands take precedence over other forms of handwritten input. Because gestures may invoke commands that may delete or otherwise change data entries, a high confidence level is desirable prior to invoking a gesture command. The gesture recognizer in this embodiment is therefore preferably assigned a relatively stringent match criteria. For example, on a scale of 0 to 100, the gesture recognizer may be assigned a minimum relative match criteria of 90, indicating that a handwritten entry will not be interpreted as a gesture unless there is at least a 90% correspondence between the handwritten entry and an appropriate subset of gesture templates. If the required 90% fit with a subset of gesture templates is attained, the entry is translated into the corresponding gesture, and the handwriting recognition process is completed.

Other information about an entry, such as its position on the display screen, its size relative to the target cell size, and the number of strokes it contains, may be used to identify or verify the type of data that has been entered. For example, since the gestures recognized by the spreadsheet of the present invention are preferably made of three strokes or less, an input filter to the gesture recognizer may be used to screen entries such as "1234", which consist of more than three strokes. Since such entries cannot be gestures, they are not sent through the gesture recognizer, thereby saving time and reducing the risk of an incorrect translation.

Certain gestures used in some embodiments of the present invention are similar to certain text or value characters. For example, the "flick" gesture is similar to a "1", the "circle" gesture is similar to a zero "0" or the letter "O", and the cross-out gesture "X" is similar to the letter "X". For these gestures, additional criteria may be applied to differentiate between a gesture and a different type of entry. For example, one criteria that may be used is that if the vertical height of a character that could be either a gesture or a text or value character is greater than the height of the target cell, then it is considered to be a gesture. If it is smaller than the height of the target cell, on the other hand, it is considered to be text or a value (but, in one embodiment, only if the target cell is empty). Another criteria that may be used to differentiate between the "cross out" gesture and an "X" is to look at the content of the target cell. Since the "cross out" gesture is used to delete an existing entry, a handwritten entry that could be either the "cross out" gesture or the letter "X" is considered to be the "cross out" gesture only if the target cell contains data. If the target cell is empty, however, the entry will be considered to be an "X".

If the gesture's required minimum match criteria is not met, or if it is otherwise determined that an entry is not a gesture, the next recognizer may be applied. Since cell B3 is a "value" cell, in this embodiment of the invention the next recognizer used is the "value recognizer". Given the fact that the cell has been designated a "value" cell, any handwritten entry into the cell is expected to be a value, and a less restrictive match criteria may be assigned to the value recognizer than is used for the gesture recognizer. Doing this effectively gives preference to the value recognizer, since a less precise fit with the templates for value characters will result in an acceptable match. For example, the minimum match criteria assigned to the value recognizer when applied to a cell such as cell B3 that has a value designated data type may have a relative value of 75, as opposed to the relative value of 90 used for the gesture recognizer described above. Because it is expected that value data will be entered in the cell, the recognition process may be simplified to differentiating among the limited number of characters that belong to the value character set.

If no acceptable match is made using the value recognizer, the next recognizer, in this case the text recognizer, is applied. Since it is less likely that the entry for a "value" cell consists of text data than value data, a more restrictive match criteria is set for the text recognizer than for the value recognizer. For example, a minimum relative match criteria of 85 may be used.

If no acceptable match is made using the text recognizer, the entry is kept in "ink" form. An exception may be made for entries that consist of three strokes or less, which may be gestures, not cell data. These are not stored as ink. Instead, an error message is generated on screen, prompting the user to re-enter.

If a handwritten entry is validly recognized as text, then, in one embodiment of the invention, an additional requirement may be selectively added by the user: namely that the translated entry must be found in a predefined dictionary of terms or a compilation of acceptable series or subsets of characters contained in the computer's memory. If the translated entry is not found, the entry is stored in the default mode, as untranslated "ink".

Figure 15A:
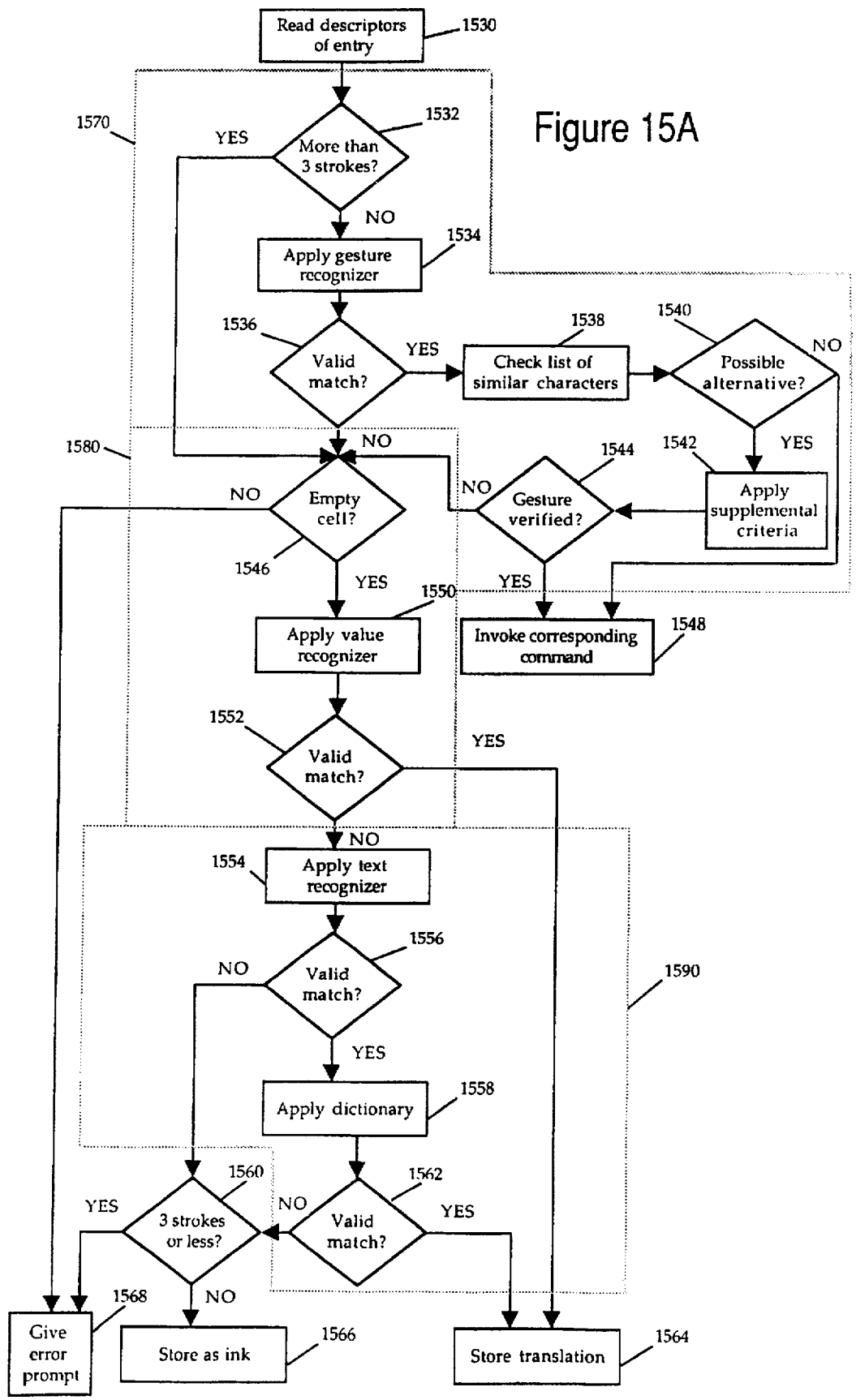
FIG. 15A illustrates a flow chart for one embodiment of the multitiered character recognition process of the present invention.

A block diagram of one embodiment of the handwriting recognition/deferred translation process of the present invention is shown in FIG. 15A. The dotted lines define three different sections of the block diagram. Section 1570, consisting of blocks 1532, 1534, 1536, 1538, 1540, 1542 and 1544, may be considered to be the "gesture recognizer" section. It consists of the gesture recognizer kernel 1534 together with other gesture recognition operations. Similarly, section 1580, consisting of blocks 1546, 1550, and 1552 may be considered to be the "value recognizer" section, and section 1590, consisting of blocks 1554, 1556, 1558 and 1562 may be considered to be the "text recognizer" section.

As described above, when a handwritten entry is entered in the computer, a series of stroke descriptors is generated. The recognition process in the embodiment shown in FIG. 15A begins at block 1530 with the reading of these descriptors.

After the descriptors have been read, the number of strokes making up the entry are checked to determine whether the entry might be a gesture. In the embodiment shown in FIG. 15A, gestures consist of three strokes or less. At block 1532, therefore, it is determined whether the entry consists of more than three strokes. If it consists of three strokes or less, the entry is sent through the gesture recognizer at block 1534. If the entry consists of more than three strokes, the entry cannot be a gesture. The gesture recognizer is skipped, and the entry is sent to the end of the gesture recognition section at block 1546.

For an entry sent through the gesture recognizer 1534, the gesture recognizer compares the descriptors of the entry against a set of gesture templates according to a predetermined criteria. This criteria may, for example, require that a match be obtained with a 85% to 90% confidence level. At decision block 1536, it is determined whether the gesture recognizer has obtained a valid match between the entry and the gesture templates.

If a valid match has been obtained, the gesture recognized is compared to a list of gestures that are similar to text and value characters (such as the "cross-out" gesture, which is similar to the letter "X" and the "circle" gesture which is similar to a "zero" or an "O") at block 1538. At decision block 1540, it is determined whether the gesture is listed as one that does have possible similar alternatives. If there are possible alternatives, supplemental criteria are applied at block 1542 to verify that the entry is a gesture. An example is testing the height of the bounds of the entry against the height of the cell, as described above. Various other tests may also be used. If the gesture is verified at block 1544, or if there were no similar characters at block 1540, the command corresponding to the translated gesture is invoked at block 1548, and the recognition sequence is complete for that entry.

If the gesture was not verified at block 1544 or if no valid match between the entry and a gesture was found at block 1536, the entry is next sent to decision block 1546, the first block of the value recognizer section 1580.

At decision block 1546, the target cell is checked to see whether it is empty. In the embodiment shown in FIG. 15A, data may be entered by handwriting only into empty cells (new data for cells already containing data may be entered only using the editing pads discussed below under "Cell Editing" below). If the target cell is not empty, the recognition process is aborted and an error prompt is displayed on the computer's display screen at block 1568.

If the target cell is empty, the value recognizer is applied at block 1550 according to a predetermined criteria. If there is a valid match as determined at decision block 1552, the translated entry is stored in the computer's memory as the content of the no valid match, the entry is there is no valid match, the entry is sent to the text recognizer section 1590.

The text recognizer, according to predetermined criteria, is applied at block 1554. If a valid match is determined to have been made at decision block 1556, the translated entry is compared to a dictionary at block 1558 to verify that the translated entry is a valid entry. If a valid match is determined to have been made at decision block 1562, the translated entry is stored in the computer's memory as the content of the target cell at block 1564.

If it is determined that there was no valid match at either decision blocks 1556 or 1562, respectively, the number of strokes of the entry are checked at decision block 1560. If the stroke has 3 strokes or less, it is likely that it was an attempted gesture, and an error prompt is displayed at block 1568 signalling the user to repeat the entry. If the stroke has more than 3 strokes, it is likely that the entry was not a gesture, and the descriptors of the entry are stored in memory as the "ink" content of the target cell.

Figure 15B:
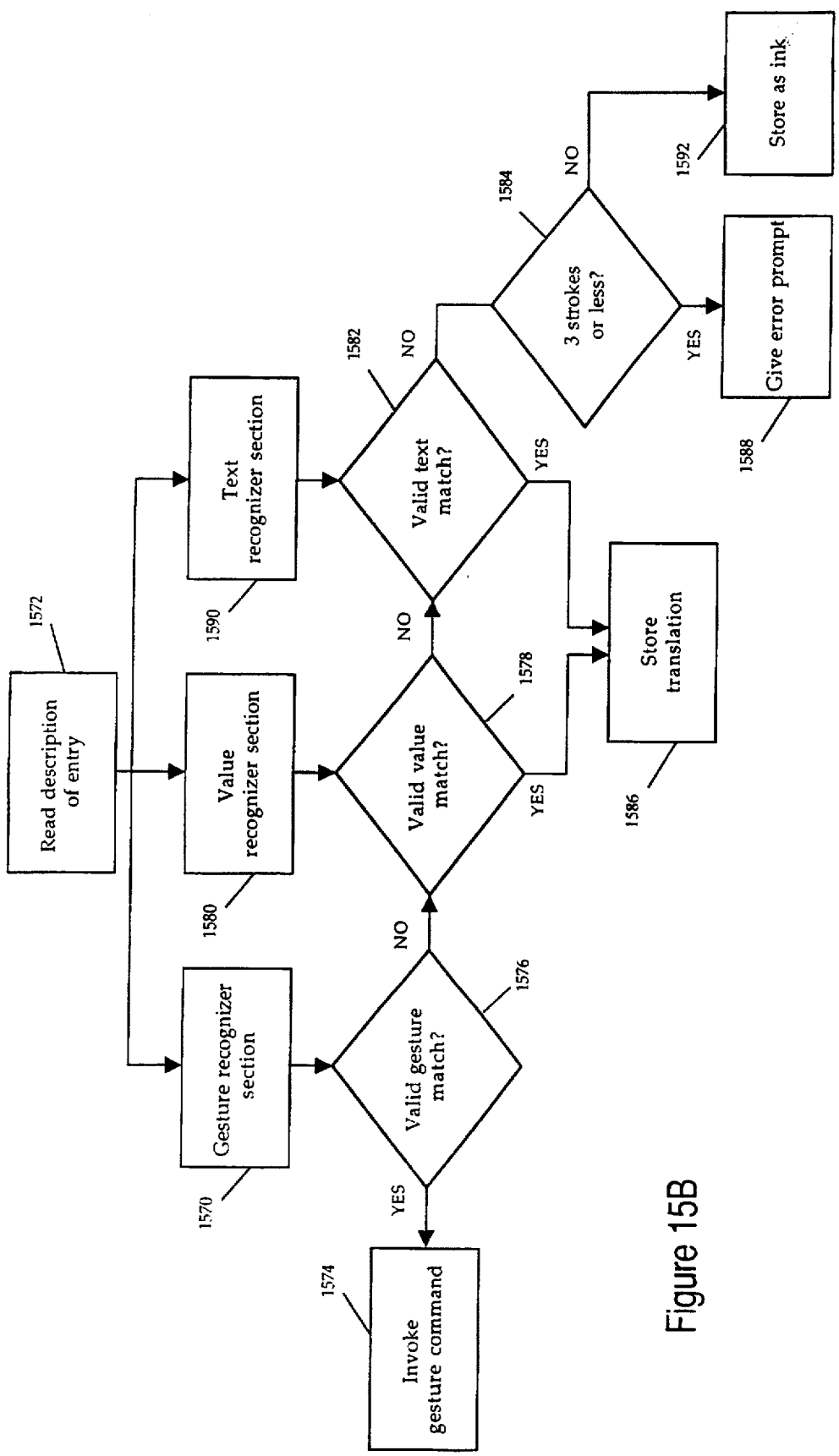
FIG. 15B illustrates a flow chart for a second embodiment of the multi-tiered character recognition process of the present invention.

FIG. 15B shows an embodiment of the handwriting recognition system of FIG. 15A in which the gesture, value and text recognizers are applied in parallel. This embodiment may be used with a computer that has multi-tasking capabilities. In this embodiment, after the descriptors have been read at 1572, they are sent in parallel through the gesture, value and text recognition sections 1570, 1580 and 1590, respectively (these sections may have the same internal makeup as the corresponding dotted-line sections in FIG. 15A, or may be different). The output of these recognizers is then inspected to determine whether a valid match has occurred. First, the output of the gesture recognizer section 1570 is tested at decision block 1576. If a valid gesture was recognized, the corresponding gesture command is invoked at block 1574.

If no gesture was validly recognized, the output of the value recognizer section is inspected at decision block 1578. If a valid match was made, the translated entry is stored in memory as the content of the target cell at block 1586.

If no value was validly recognized, the output of the text recognizer section is inspected at decision block 1582. If a valid match was made, the translated entry is stored in memory as the content of the target cell at block 1586.

If no valid match was made by any of the recognizers, the number of strokes of the entry is inspected at decision block 1584. If the entry consists of 3 strokes or less, an error prompt is displayed on the screen at block 1588. If the entry consists of more than three strokes, the descriptors of the entry are stored as the "ink" content of the target cell at block 1592.

Figure 15C:
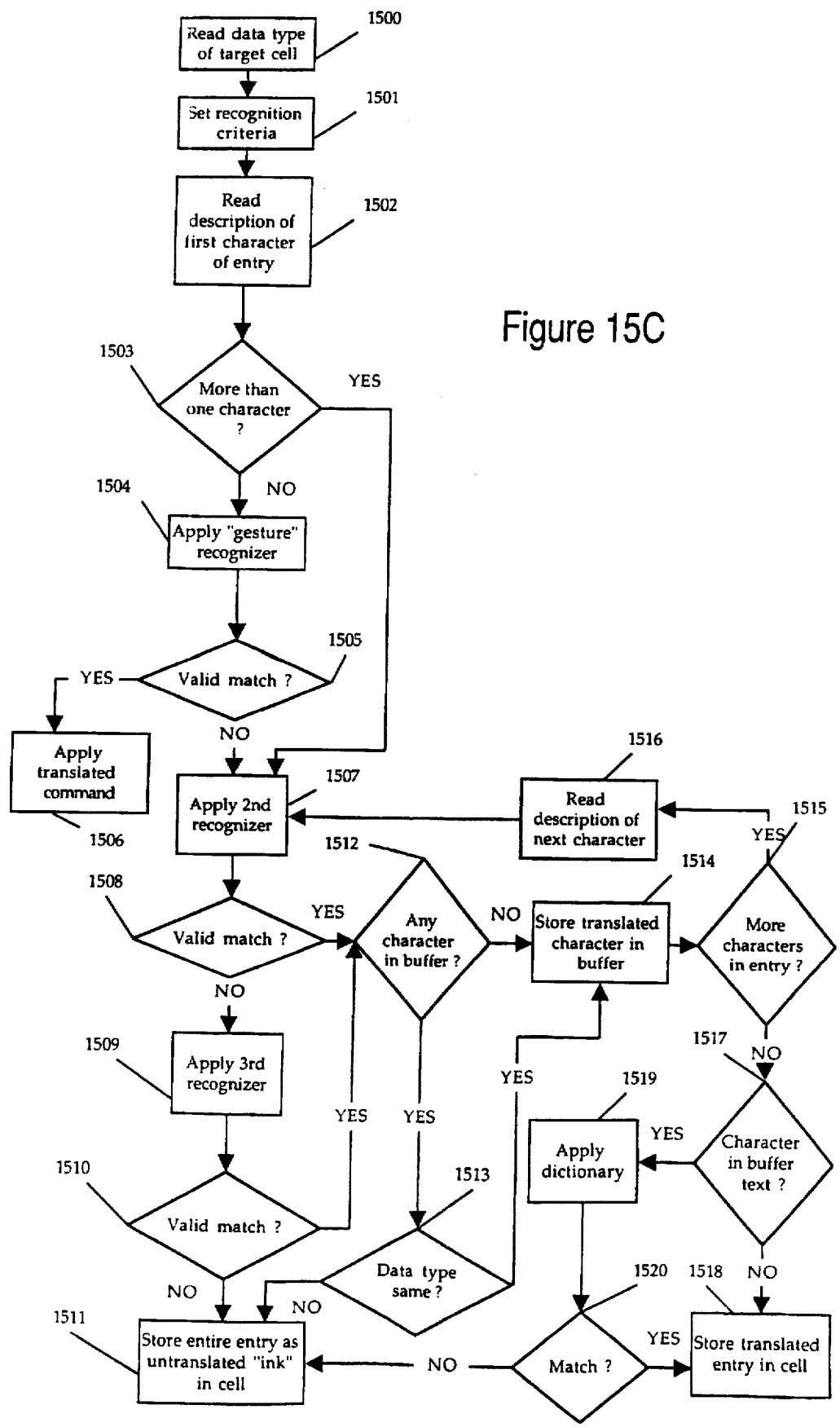
FIG. 15C illustrates a flow chart for a third embodiment of the multi-tiered character recognition process of the present invention.

A flow chart for a further embodiment of the handwriting recognition process of the present invention is shown in FIG. 15C. As shown in FIG. 15C, to begin the process in this embodiment, the predesignated data type for the target cell is read (block 1500). The example described above for cell B3 of FIG. 14, the cell is a "value" cell. Next, the recognition criteria is set according to the data type designation of the target cell (block 1501). The recognition criteria includes the sequence in which recognizers are applied and the minimum match criteria required for each recognizer. For cell B3, the recognizer sequence is (1) gesture recognizer, (2) value recognizer and (3) text recognizer. Illustrative values for the minimum relative match criteria are 0.90, 0.75 and 0.85, respectively.

After the recognition criteria has been set, the description for the first handwritten character of the entry is read (block 1502). If there is only one character in the entry, the gesture recognizer is applied to determine whether that character is a gesture (blocks 1503 and 1504). If the gesture recognizer generates a valid match (block 1505), the command corresponding to the recognized gesture is applied (block 1506). If the gesture recognizer produces no valid match (block 1505), or if there are more than a single character in the handwritten entry (block 1503), then the second recognizer (in this case the value recognizer) is applied to the character (block 1507). If the second recognizer produces no valid match (block 1508), then the third recognizer (in this case the text recognizer) is applied (block 1509). If the third recognizer produces no valid match (block 1510), the entire entry is stored as untranslated "ink" (also referred to as "scribble") (block 1511).

If either the value recognizer (block 1507) or the text recognizer (block 1509) do produce a valid match (blocks 1508 or 1510), the data type of the recognized character is compared to any other character that forms part of the same entry (blocks 1512 and 1513) and that has already been recognized, and is stored in a recognized character buffer (block 1514). If the data type of the new character is the same as the data type of all stored characters (block 1513), or if there are no prior characters in the buffer (block 1512), the translated character is added to the buffer (block 1514). If the data type of the new character is different, the entire entry is stored as untranslated "ink" in the target cell (block 1511).

After a character has been added to the buffer (block 1514), if there are any additional characters in the entry (block 1515), the next character is read (block 1516), and the recognition process, beginning with the application of the value recognizer, is applied to the next character in the same manner as it was applied to the preceding character.

If there are no additional characters in the entry (block 1515), and if the recognized and translated characters in the buffer have any data type other than "text" (block 1517), the translated characters are entered into the target cell, in this case, cell B3 (block 1518).

If the characters in the buffer are text characters (block 1517), the character sequence in the buffer is run through the dictionary to determine whether it forms a valid term (block 1519). If the character sequence matches a valid dictionary entry (block 1520), the term is entered into the target cell (block 1518). If it does not match a dictionary entry (block 1520), the entire entry is stored in its original untranslated form (block 1511).

The same procedure described above for translation of an entry for a cell that has a value designation is used for a cell having a text designation, an "ink" or "scribble" designation, or no designation. The only difference is in the sequence in which the different recognizers are applied and the values of the minimum match criteria assigned to each recognizer. Table 7 lists the recognizer sequences and corresponding minimum match criteria used in one embodiment of the multi-tiered character recognition method of the present invention.

TABLE 7

Multi-Tiered Recognition Criteria

| Cell Format | Recognizer Sequence | Min. Rel. Match Levels |
|---|---|---|
| Value | 1. Gesture | 0.90 |
|  | 2. Value | 0.75 |
|  | 3. Text | 0.85 |
| Text | 1. Gesture | 0.90 |
|  | 2. Text | 0.75 |
|  | 3. Value | 0.85 |
| None/Ink | 1. Gesture | 0.90 |
|  | 2. Value | 0.85 |
|  | 3. Text | 0.85 |

Although the character recognition method of the present invention has been described with respect to specific examples, the invention is not limited to the specific embodiments described. The inventive method of using multiple tiers of recognizers, customizing the recognition criteria for each tier, and/or customizing the sequence of recognizers for varying types of handwritten entries, can be applied in a variety of combinations and with a variety of specific values and configurations. These may be predetermined by the programmer, or may be user selected, allowing a user to customize the recognition process to his or her needs.

The translated form of a handwritten entry, consisting simply of a sequence of machine readable characters (as opposed to the coordinate and vector data used to represent a handwritten entry in its untranslated "ink" form), requires less memory than the corresponding "ink" entry. Accordingly, to minimize memory requirements, it is usually desirable to discard the "ink" form of an entry after it has been successfully translated according to the method described above. However, at times it may be desirable to retain both the original "ink" form as well as the translated form of an entry. In one embodiment of the present invention, even though the translated form of an entry is normally displayed as the content of a cell, the original "ink" form is retained in memory as well. The user may toggle the displayed cell entry between the translated and the original ink forms of the entry.

Cell Editing

In addition to providing for improved data entry into spreadsheet cells, the present invention also provides for improved editing of the contents of spreadsheet cells. In one embodiment of the invention, a cell is edited by simply writing a new entry over an existing entry. The same process described above for entry of handwritten data into an empty cell is used for entering new data into a cell already containing data, except for the additional step of discarding the existing content of the cell prior to storing the new data.

In another embodiment of the present invention, pop-up editing pads are used to edit a spreadsheet cell entry. To edit a cell, an "editing pad" is called up by writing a predetermined gesture on the cell. Writing the gesture on the cell selects the cell, if it is not already selected, and calls up the editing pad as well. In the preferred embodiment of the present invention, the circle gesture ("O") calls up an editing pad. In one embodiment, two editing pad versions are available. In this embodiment, an up-caret ("^") gesture invokes a "regular" editing pad, while a circular gesture ("O") invokes an alternate, and preferably more powerful, editing pad.

Figure 16A:
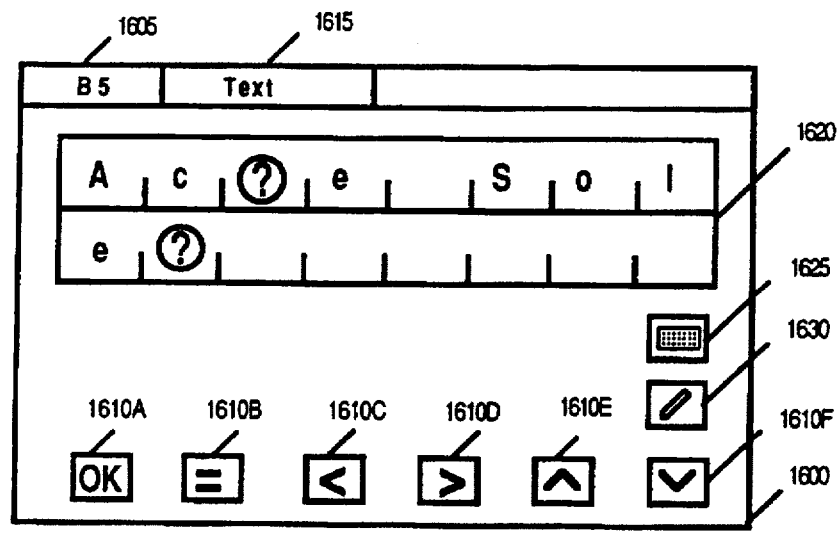
FIGS. 16A to 16D illustrate different versions of the adaptive "regular" editing pad of the present invention.

FIG. 16A illustrates an editing pad that would be called up by writing a circle gesture on cell B5 of FIG. 14 in one embodiment of the invention. The editing pad 1600 shown in FIG. 16A consists of a rectangular box containing an address display area 1605 that indicates the address of the cell being edited (in this case, cell B5), a data type display area 1615 that indicates the data type designation for the cell (in this case, Text), an entry display area 1620 that displays the content of the cell in a format based on the designated data type for the cell, navigation buttons 1610a to 1610f that are used to accept an edited entry and to initiate editing of adjacent cells, a gesture box toggle button 1630 that allows navigation buttons 1610 to be replaced with a gesture pad, and, in certain embodiments of the invention, an editing pad toggle button 1625 that allows toggling between a regular editing pad and an alternate editing pad. Editing pad 1600 may be used for both "text" and "value" cells.

To edit the content of a cell using edit pad 1600, corrections are made with the stylus by writing on the entry display area 1620. Entry display area 1620 shows the existing cell content in a format that depends on the type of data in the cell or the cell's designated data type. For a cell such as cell B5 that contains text or a value, the cell content is displayed character by character on a "comb" displayed on entry display area 1620. If the content of a cell consists of machine readable characters, those characters are displayed. If the content of the cell consists of untranslated "ink", the best guess translation of each character is displayed after the cell entry has been run through a recognizer. Any of the recognition processes described above for translating handwritten cell entries may be used. Preferably, each recognized character is displayed regardless of whether other characters are recognized and regardless of whether all characters of an entry are of the same data type (or, in the case of a text entry, whether the entry is found in a dictionary). If a character is not recognized, a question mark ("?") may be displayed in lieu of that character. The same recognition criteria, as listed in Table 7, may be used. However, less restrictive match criteria may be used to allow display of the computer's "best guess" for the translation of each character.

FIG. 16A displays the computer's "best guess" using the recognition criteria listed in Table 7 for a cell having a "text" data type designation. In the example shown in FIG. 16A, the computer's best guess for the handwritten entry "Acme Sales" is "Ac?e Sole?". In this example, the computer correctly recognized the "A", "c" and "e" of "Acme" and the "S", "l" and "e" of "Sales". It was unable to recognize the "m" of "Acme" and the "s" of "Sales", and incorrectly translated the "a" in "Sales" as an "o".

To correct the entry, the correct characters are handwritten over the incorrect or unrecognized characters. To replace the "?" in "Ac?e", an "m" is written over the "?" with the stylus. After the "m" has been written, the character recognition system of the present invention is immediately applied, and the result of the recognition process replaces the previously displayed character. Occasionally, a character must be corrected more than once before the proper translation is made. The same procedure used to correct the "?" in "Ac?e" can be used to correct the "o" and the "?" in "Sole?".

After editing of an entry on entry pad 1600 is completed, one of the navigation buttons 1610 is activated to replace the current cell contents with the edited entry. In one embodiment of the invention, a navigation button is activated by tapping it with the stylus.

Depending on which navigation button 1610 is activated, an additional function may be invoked simultaneously with the entering of the edited entry into the cell. For example, activating navigation button 1610a causes the edited entry to be entered into the cell and the editing pad to be "closed", that is, removed from the display. Activating navigation button 1610b, on the other hand, causes the edited entry to be entered into the cell without closing the editing pad. Activating navigation button 1610c through 1610f causes the edited entry to be entered into the currently selected cell, and selects the immediately adjacent cell, in the direction of the arrow displayed on the navigation button, for editing. For example, activating navigation buttons 1610c of FIG. 16A (which displays a left arrow) causes the displayed entry to be entered into cell B5 (the currently selected cell) and the cell immediately adjacent to the left of cell B5, namely cell A5, to be selected. The editing pad remains displayed, but its content changes to reflect the content and data type of the newly selected cell. Similarly, activating navigation button 1610d selects cell C5, activating navigation button 1610e selects cell B4, and activating navigation button 1610f selects cell B6.

Figure 16B:
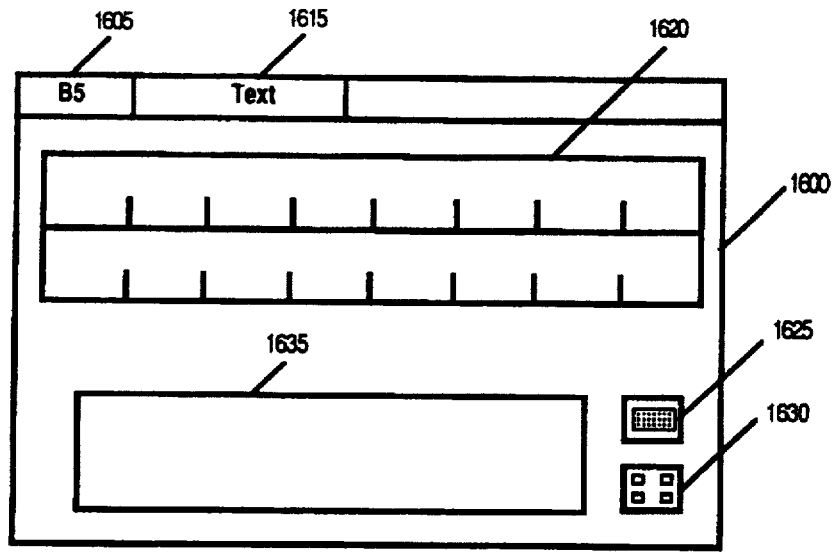

Activating gesture pad toggle button 1630 shown in FIG. 16A causes navigation buttons 1610 to be replaced with a gesture navigation pad 1635, shown in FIG. 16B. Gesture navigation pad 1635 allows the functions performed by navigation buttons 1610 to be performed with gestures written on gesture navigation pad 1635. In one embodiment of the present invention, writing a "flick" left, right, up and down on gesture navigation pad 1635 in FIG. 16B is equivalent to activating navigation buttons 1610c, 1610d, 1610e and 1610f, respectively, in FIG. 16A. Activating toggle button 1630 in FIG. 16B replaces the gesture navigation pad 1635 with navigation buttons 1610. Preferably, only gestures are accepted as entries by the gesture navigation pad 1635. Accordingly, only the gesture recognizer is applied to handwritten characters entered on gesture navigation pad 1635. If a character is not recognized as a gesture, a prompt preferably appears telling the user that the gesture must be reentered.

In those embodiments of the editing pad that incorporate an editing pad toggle button 1625 (as shown in FIG. 16A), activating editing pad toggle button 1625 toggles between the "regular" editing pad shown in FIG. 16A and one or more alternate editing pads. The particular editing pad that appears when editing pad toggle button 1625 is activated depends on the data type of the cell being edited.

Figure 17A:
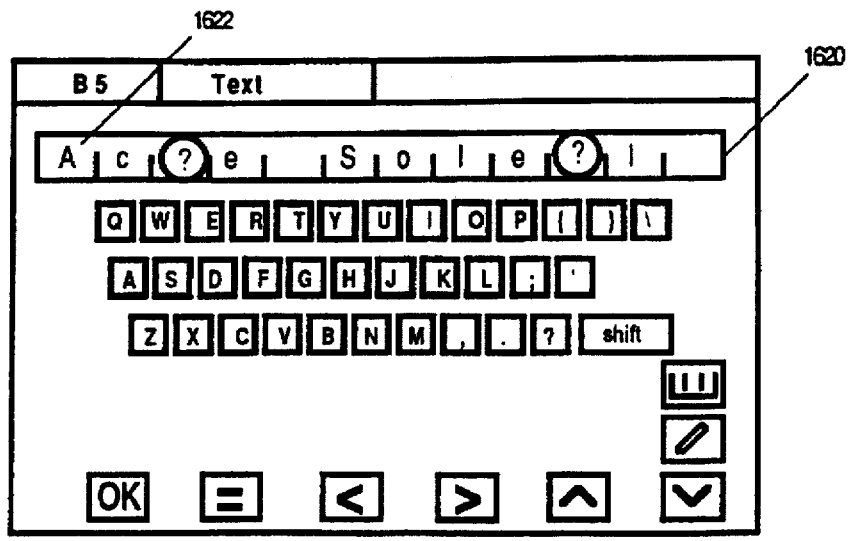
FIGS. 17A and 17B illustrate different versions of the adaptive "alternate" editing pad of the present invention.

For a cell containing "text" data or having a "text" designation, the alternate editing pad may be an editing pad depicting a typewriter-like keyboard. An embodiment of such an alternate editing pad is shown in FIG. 17A. When this pad is activated, the entry displayed in entry display area 1620 is edited by tapping on the keys of the displayed keyboard with the stylus rather than by handwriting corrections directly on entry display area 1620. A cursor 1622 indicates the position at which the character selected on the keyboard will be inserted in the displayed entry.

Figure 17B:
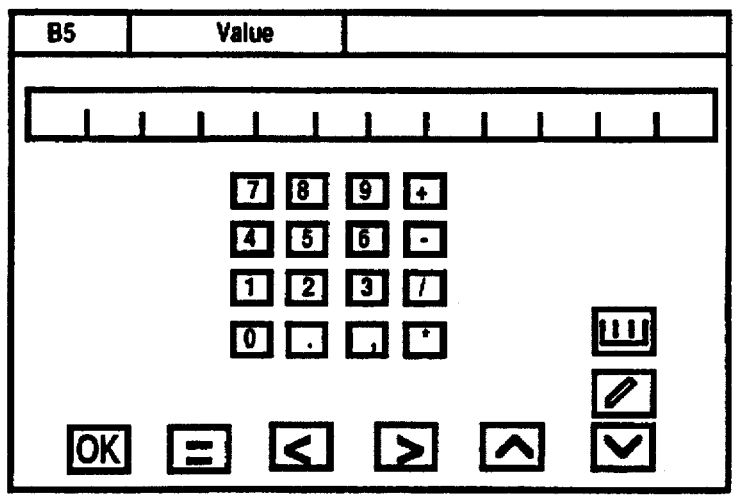

For a cell containing "value" data or having a "value" data type designation, the alternate editing pad may be an editing pad depicting a numerical keypad. An embodiment of such an alternate editing pad is shown in FIG. 17B. A third type of editing pad, displaying a list of arithmetic formulas (such as the "SUM" formula described above for adding together the contents of selected cells), may be used instead of or in addition to the "regular" and keypad editing pads. If all three types of editing pads are used, they may be accessed sequentially by activating editing pad toggle button 1625, or an additional editing pad toggle button may be used.

A somewhat different editing pad from the editing pad used for cells containing "text" or "value" data or having "text" or "value" data type designations is used for cells containing "ink" or having an "ink" data type designation (or for cells having no data type designation). As shown in FIG. 16D, entry display area 1620 for the "ink" editing pad consists of an undivided entry area (no "combs" are displayed). The entry display area 1620 represents a scaled, and usually an enlarged, view of the currently selected cell. If the selected cell already contains an "ink" entry, the user can elect to display that entry on the editing pad, or instead the user may elect to have the entry displayed on the spreadsheet itself, but not on the editing pad.

If the user elects to display the "ink" content of the cell on the editing pad, the handwritten characters or other graphic elements that comprise the entry are displayed on entry display area 1620. These elements are displayed in a magnified form corresponding to the magnification level provided by the editing pad in the same manner discussed above with respect to different "zoom" levels that can be displayed in certain embodiments of the invention. The displayed elements may be edited (they may be moved or deleted by entering predetermined editing gestures or by utilizing editing functions supplied by the operating system), and new elements may be added.

Any new handwritten entry written on the entry display area 1620 of the editing pad is displayed full size on the editing pad. After the handwritten entry has been entered on entry display area 1620 and an "Accept" command is given, a set of descriptors for the strokes making up the new entry (including a magnification factor identifying the relative magnification level of the entry display area 1620) are added to the data content of the cell. The cell content is then displayed on the spreadsheet itself in the normal manner.

As mentioned above, the recognition criteria for the handwriting recognition method of the present invention may be varied for recognizing the "ink" content of cells having different data type designations. Changing the recognition criteria that is used may change the results obtained from the translation process, as shown below.

Figure 16C:
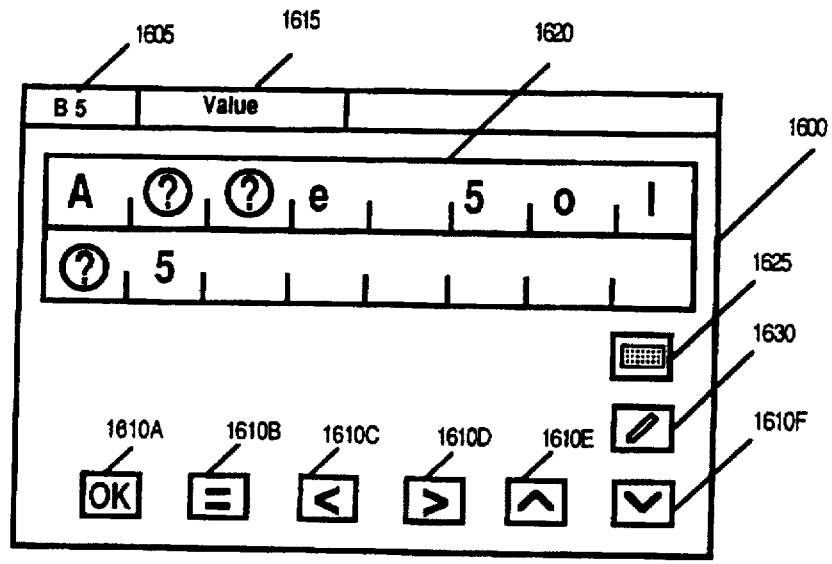
Figure 16D:
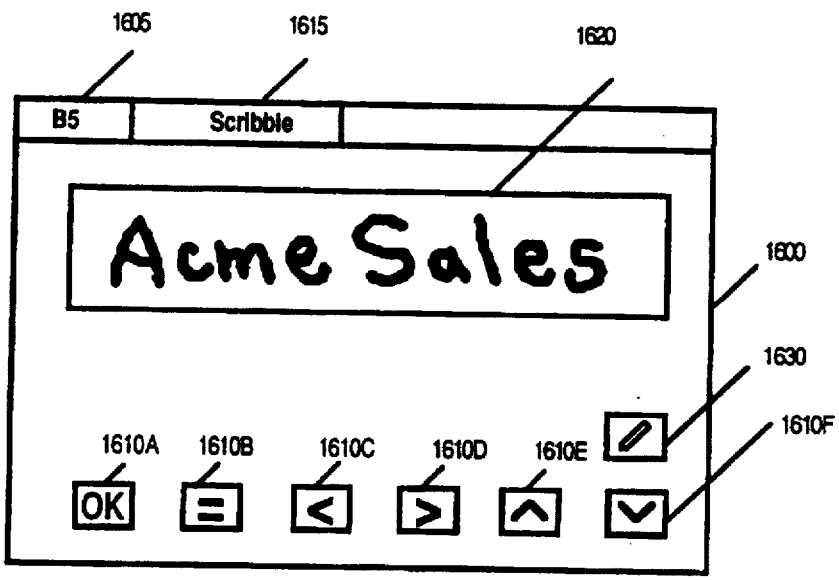

FIG. 16C illustrates how handwriting translations displayed on entry display area 1620 of editing pad 1600 of FIG. 16A may change when the data type designation of cell B5 is changed from "text" to "value". For a cell designated a "value" cell, the recognition criteria used is biased towards the recognition of numbers and arithmetic operators, as opposed to text. As shown in FIG. 16C, a character that could potentially be either a text character or a number, such as the two s's and the 1 of the entry "Sales", may be interpreted as a number by the value-biased recognition process used for "value" designated cells, rather than as an alphabetic character. In FIG. 16C, the two s's and the 1 of "Sales" are recognized as two 5's and a 1 rather than the "S" and the "l" that are recognized by the text-biased recognition process used for in FIG. 16A. In addition, text characters that are recognized by the text-biased recognition process used for FIG. 16A may remain unrecognized by the value-biased recognition process used for FIG. 16B, since a more restrictive match criteria may be used (as specified in Table 7). For example, the value-biased recognition process used for FIG. 16C may not recognize the "c" in "Acme" or the "e" in sales, as shown in FIG. 16C. That is because in a value-biased recognition process, a more restrictive match criteria is used when the text recognizer is applied.

If a cell is designated as an "ink" or "scribble" cell, no translation is attempted, and the cell content is displayed in its original "ink" form on editing pad 1620, as shown in FIG. 16D.

Figure 26:
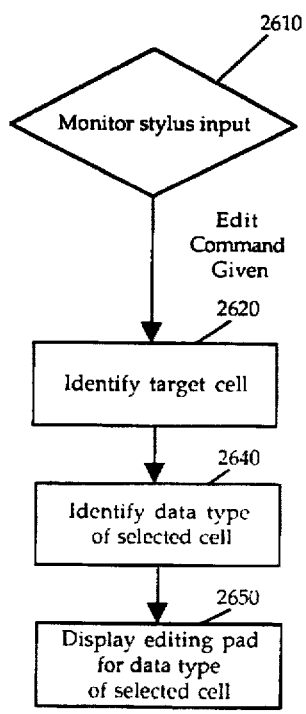
FIG. 26 illustrates a flow chart for one embodiment of the editing pad system of the present invention.

FIG. 26 is a flow chart of the process steps used by one embodiment of the present invention for displaying an editing pad. User input is monitored at block 2610. When an edit command is received, the target cell (that is, the cell that is to be edited) is identified at block 2620. The data type of the target cell is identified at block 2640, and the corresponding editing pad is displayed at block 2650.

Block Selection

In addition to providing for improved editing of individual spreadsheet cells, the present invention provides for improved manipulation of blocks of cells as well.

Certain spreadsheet operations are performed on blocks of cells, as opposed to a single cell at a time. Such "block" operations typically include printing, copying, moving, formatting, and replicating. To perform one of these operations on a block of cells, the block must be selected. In the prior art, a block is selected by indicating the first cell of the block, indicating the last cell of the block, and giving an appropriate command for selecting the block. In Microsoft Excel®, for example, a block is selected by (1) positioning a mouse cursor over the first cell of the block, (2) clicking a mouse button and dragging the mouse to the last cell of the block, and (3) releasing the mouse button.

The present invention allows quick, efficient selection of a block of contiguous cells with a single gesture. FIG. 18 illustrates the spreadsheet of FIG. 14 with additional information entered in the spreadsheet. A block operation is used for the spreadsheet of FIG. 18, for example, to change an ordered item. For example, row 11, columns A to D, specify that 50 7" Std. Widgets at a unit price of $6.25 are ordered. If this entry is incorrect, the content of these cells can be erased by selecting the block consisting of cells A11, B11, C11 and D11 and invoking an "erase" command.

The present invention allows the block consisting of cells A11, B11, C11 and D11 to be selected using a single, directional gesture. The starting point of the gesture is made on the first cell of the to be selected. The present invention then automatically selects all cells in the direction of the gesture up to the next "boundary".

As used in the present invention, a "boundary" is defined to occur where there is a change in cell type between adjacent cells. In one embodiment of the present invention, a "boundary" is defined to occur at the edges of the spreadsheet and between any empty cell and an adjacent non-empty cell. In row 11 of the spreadsheet in FIG. 18, for example, the first boundary is at the left edge of cell A11 (the edge of the spreadsheet). The next boundary occurs between cells D11 and E11 (since there is a change from a non-empty cell (cell D11) to an empty cell (E11)). In other embodiments of the present invention, other definitions of boundaries may also be used. For example, a boundary may be defined to also occur between two adjacent cells containing different data types. Using this definition, a boundary would also occur between cell A11 (a "text" cell) and cell B11 (a "value" cell). If both definitions are used, a different directional gesture may be used for each type of boundary.

Figure 19A:
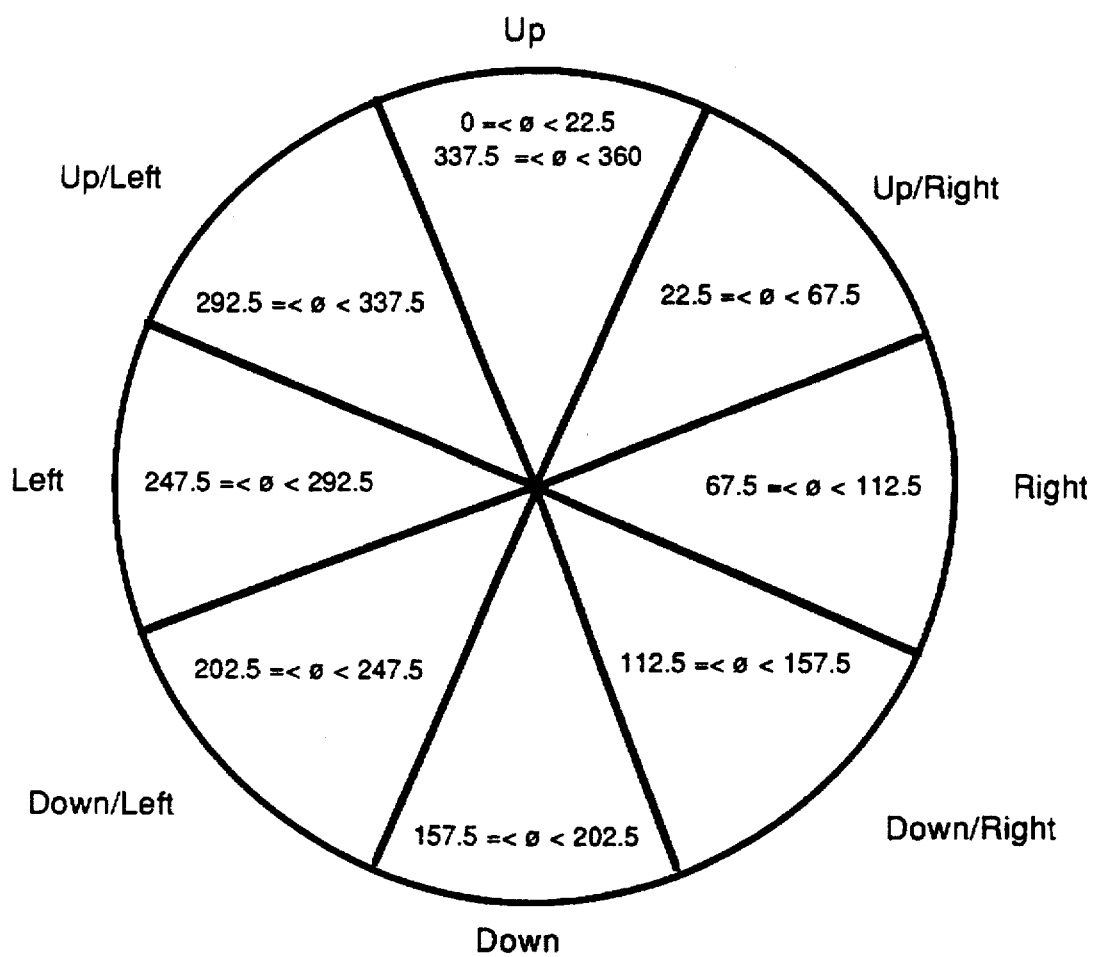
FIGS. 19A and 19B illustrate how the direction of a directional double tap is determined by first and second embodiments of the present invention.

In one embodiment of the present invention, the directional gesture used for selecting blocks of cells is a "directional double-tap". A "directional double-tap" is a combination of two quick taps made with the stylus on the display. The first tap is made on the cell at the beginning of the block to be selected. The second tap is made slightly apart from the first tap in the direction in which cells are to be selected. In this embodiment of the present invention, a block may be selected in one of eight directions: (1) to the right, (2) diagonally up and to the right, (3) straight up, (4) diagonally up and to the left, (5) to the left, (6) diagonally down and to the left, (7) straight down, and (8) diagonally down and to the right. FIG. 19A and Table 8 illustrate the relative range of directions of the second tap from the first tap which specify each of these 8 directions in one embodiment of the invention.

TABLE 8

Interpretation of Directional Double-Tap

| Direction ø of Second Tap From First Tap | Direction of Block Selection |
|---|---|
| 0° = < ø < 22.5° | Up |
| 22.5° = < ø < 67.5° | Up and to Right |
| 67.5° = < ø < 112.5° | Right |
| 112.5° = < ø < 157.5° | Down/Right |
| 157.5° = < ø < 202.5° | Down |
| 202.5° = < ø < 247.5° | Down/Left |
| 247.5° = < ø < 292.5° | Left |
| 292.5° = < ø < 337.5° | Up/Left |
| 337.5° = < ø < 360° | Up |

Figure 19B:
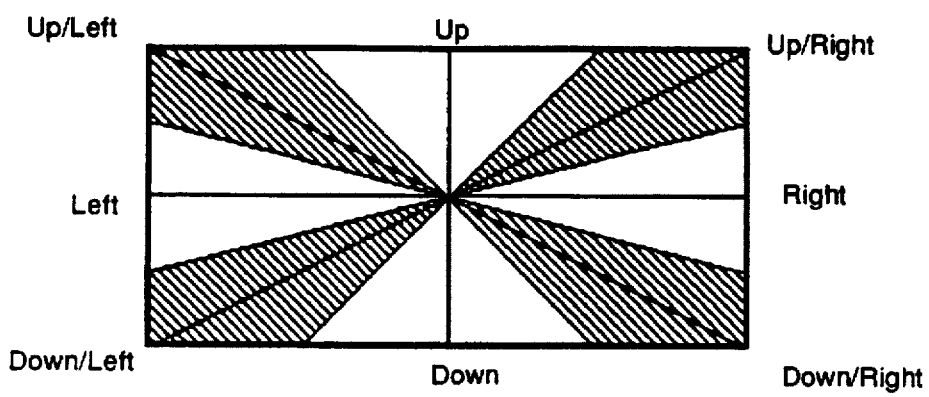

In another embodiment of the invention, the direction in which a block is selected is determined by comparing the slope of the line connecting the first and second taps to the slopes of the horizontal and vertical bisectors and the two diagonals of the cell in which the first tap is made. The line that has a slope closest to the slope of the line connecting the two taps determines the direction of block selection, as shown in FIG. 19B.

To select cells A11 to D11 in the example of FIG. 18, a double-tap gesture is made on the display, the first tap being made anywhere on cell A11 and the second one made slightly apart from the first tap and generally to the right. Items 1800 and 1810 on FIG. 18 are examples of the first and second taps, respectively, of such a double-tap gesture.

This embodiment of the present invention selects the desired block of cells as follows. After the double-tap entry has been completed, the description of the entry is processed through the multi-tiered recognition system of the present invention, as described above. In the case of the double-tap shown on FIG. 18, the gesture is recognized as a directional-double tap in the "right" direction. According to the invention, the cell in which the initial tap is made is selected (in this case, cell A11), and the type of the cell (empty/non-empty) is determined. In the present example, cell A11 is a "non-empty" cell. Next, the type of cell immediately to the right of cell A11 is examined to determine if it is empty or non-empty. If it is non-empty, it is also selected, and the next cell, immediately to the right of the second cell, is examined. This process is continued until an empty cell is encountered, at which point the block selection process is completed. In the present example, cell E11 is the first empty cell to the right of cell A11. Accordingly, the block consisting of cells A11, B11, C11 and D11 will be selected in response to a "right" directional double-tap on cell A11.

A vertical or horizontal directional double tap selects cells along a column or row, respectively. A diagonal double tap selects a two-dimensional block.

To select the two dimensional block consisting of cells A5, A6, B5, B6 and B7 in FIG. 18, an double tap gesture is made on the display. The first tap 1820 is made anywhere on cell A5 and the second tap 1830 is made slightly apart from the first tap and generally down and to the right in a direction parallel to a diagonal of cell A5. In this example, the desired block of cells is selected as follows. The cell in which the first tap was made, cell A5, is selected, and its type determined. Cell A5 in the example of FIG. 18 is a "non-empty cell". Next, the cell immediately to the right (cell B5) and the cell immediately down (cell A6) from cell A5 are examined and their types determined. If either cell is the same type as the original cell A5, that cell is selected. In the example of FIG. 18, both cells B5 and A6 are "non-empty", the same as cell A5. Cells B5 and A6 are therefore also selected, and the cells immediately to the right and immediately down from each of cells B5 and A6 are examined in the same manner as the cells immediately to the right and immediately down from original cell A5 were examined. Cell C5, the cell immediately to the right of cell B5, and cell A7, the cell immediately down from cell A6, are "empty" cells. Since they are not of the same type as cells A5, A6 and B5, cells C5 and A7 are not selected. Cell B6, the cell both immediately down from cell B5 and immediately to the right from cell A6 is, however, like cells A5, A6 and B5, a "non-empty" cell. Cell B6 is selected, and cells B7 and C6 are examined. Cell B7 is a "non-empty" cell, cell C6 is "empty". Accordingly, cell B7 is selected, cell C6 is not. Finally, cells B8 and C7, the cells immediately to the right and down from cell B7, are examined. Since they are both "empty", neither is selected, and the selection process is completed.

FIGS. 20A to 20D illustrate examples of the two dimensional blocks that are selected by four different diagonal directional double taps.

Each of FIGS. 20A to 20D illustrate a spreadsheet having five columns "A" to "E" and seven rows "1" to "7". "X"'s indicate non-empty cells, namely cells B2 through D6. In each case, a directional double tap is made with the first tap in cell C4.

Figures 20A, 20B, 20C:
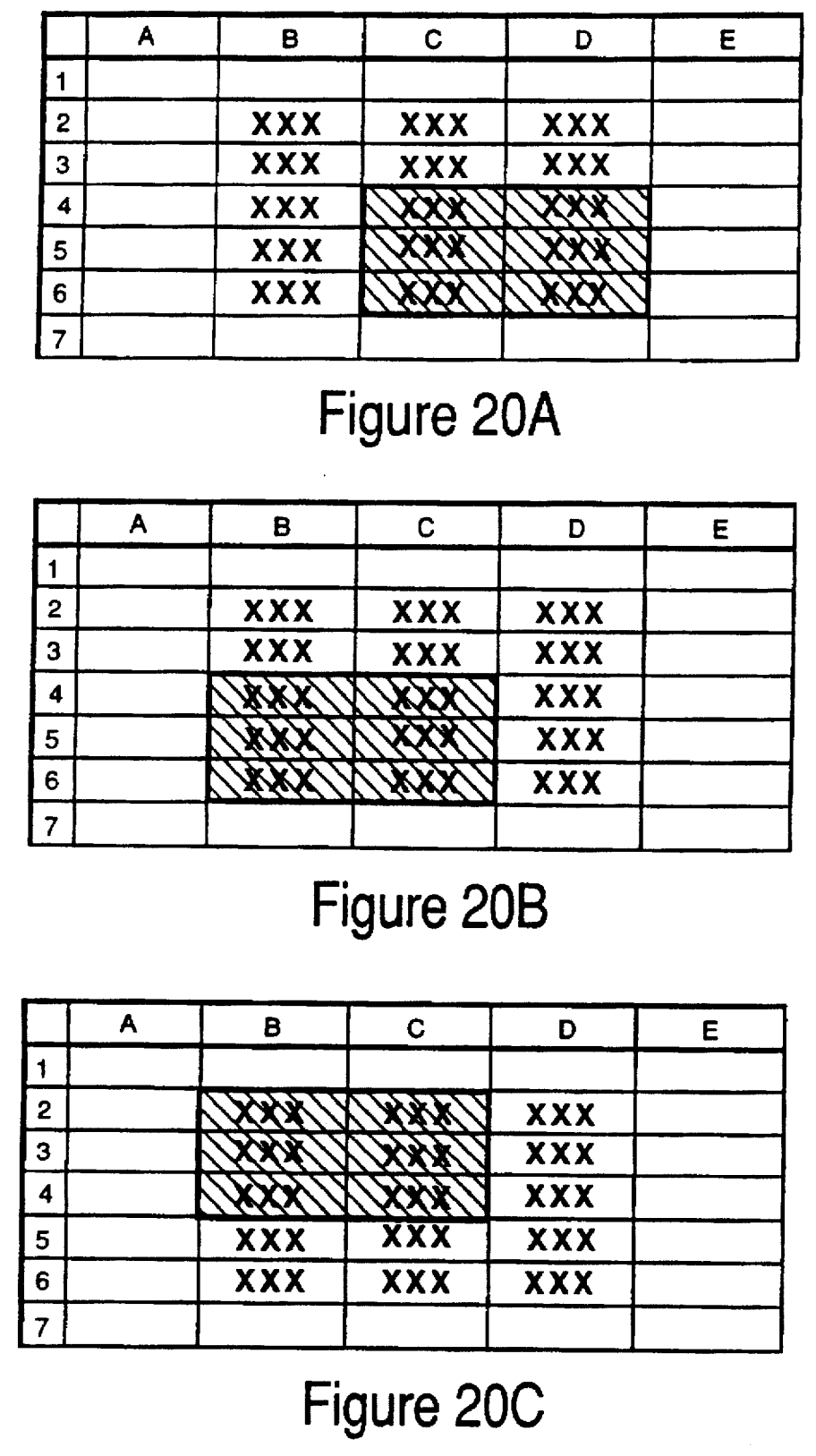

FIG. 20A illustrates the block that is selected if the double tap indicates a direction of "down and to the right". For this kind of double tap, all non-empty contiguous cells to the right and below cell C4 are selected: namely cells C4 to D6.

FIG. 20B illustrates the block that is selected if the double tap indicates a direction of "down and to the left". For this kind of double tap, all non-empty contiguous cells to the left and below cell C4 are selected: namely cells B4 to C6.

FIG. 20C illustrates the block that is selected if the double tap indicates a direction of "up and to the left". For this kind of double tap, all non-empty contiguous cells to the left and above cell C4 are selected: namely cells B2 to C4.

Figures 20D, 21:
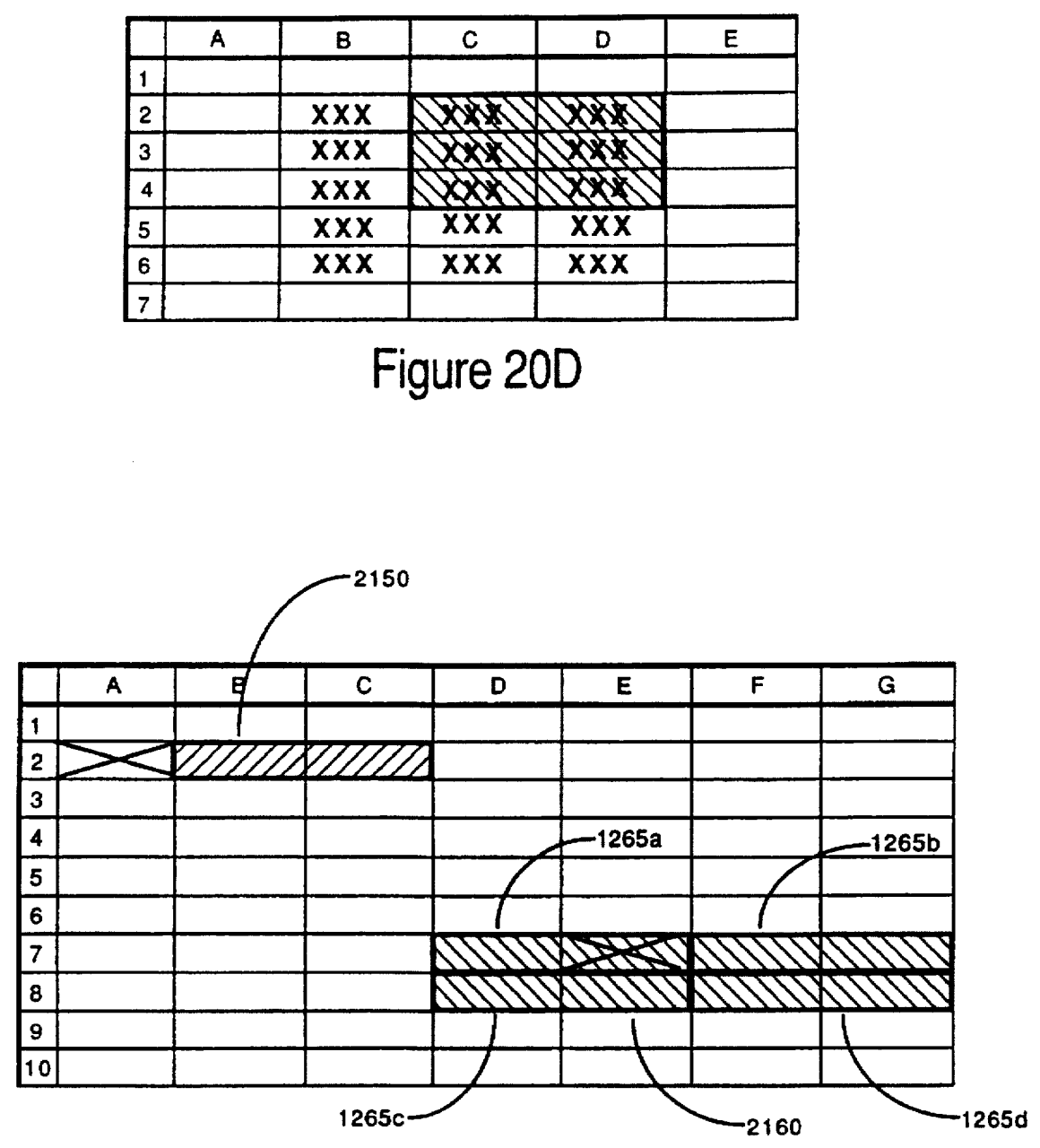

FIG. 20D illustrates the block that is selected if the double tap indicates a direction of "up and to the right". For this kind of double tap, all non-empty contiguous cells to the right and above cell C4 are selected: namely cells C2 to D4.

The directional cell selection method described above may be used with other directional gestures other than the double-tap gesture described above. For example, an arrow pointing in the direction of the desired block selection may be used. The method can also be used with other types of data arranged in two or three dimensional grids or arrays in addition to spreadsheet cells. For example, it may be used with crossword puzzles to select blocks of squares, or with text documents to select sections of a document.

Block Replication

The present invention provides an improved block replication process. "Replication" is an operation where multiple copies of a selected block of cells are copied side by side over a selected range of cells. FIG. 21 illustrates the replication process used by prior art spreadsheet programs. The original block 2150 that is to be replicated consists of cells B2 and C2. The target range 2160 over which the original block 2150 is to be replicated consists of cells D7 to G8. Since the original block 2150 consists of a two-column by one-row cell array and the target range 2160 consists of a four-column by four-row array, four copies 1265a to 1265b of the original block 1250 fit into target range 1260.

When a cell containing a formula that relates to the content of other cells is copied to a new cell, the relative relationship of the cells specified in the formula to the cell containing the formula is preserved. For example, if cell C3 contains the formula "+2*B3" (that is, the contents of cell C3 is equal to two times the content of cell B3), the replicated copy of cell C3 at cell E7 will contain the formula "+2*D7". The relationship between cells D7 and E7 is the same as between B3 and C3 (D7 is immediately to the left of E7, as B3 is to C3).

Undesired results can occur when a cell being replicated contains a formula that refers to a cell that is not contained in the block being replicated. For example, if cell C3 contains the formula the "+2*A3", replicated cell G7 will contain the formula "+2*E7" (since the positional relationship between cells C3 and A3 is the same as between G7 and E7). Cell E7, like cell G7, is also a replication of cell C3, and contains the formula "+2*C7". The value of the content of cell G7 will, in effect, be the result of a double application of the formula of cell C3. This may be an undesired result.

Figure 22A:
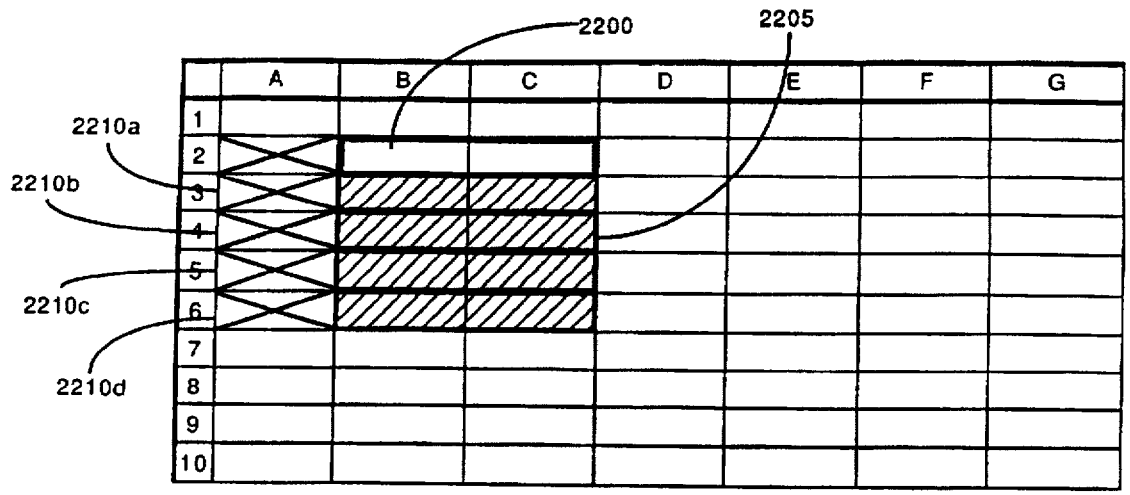
FIGS. 22A and 22B illustrate how a block of cells may be replicated using the restrained replication method of the present invention.
Figure 22B:
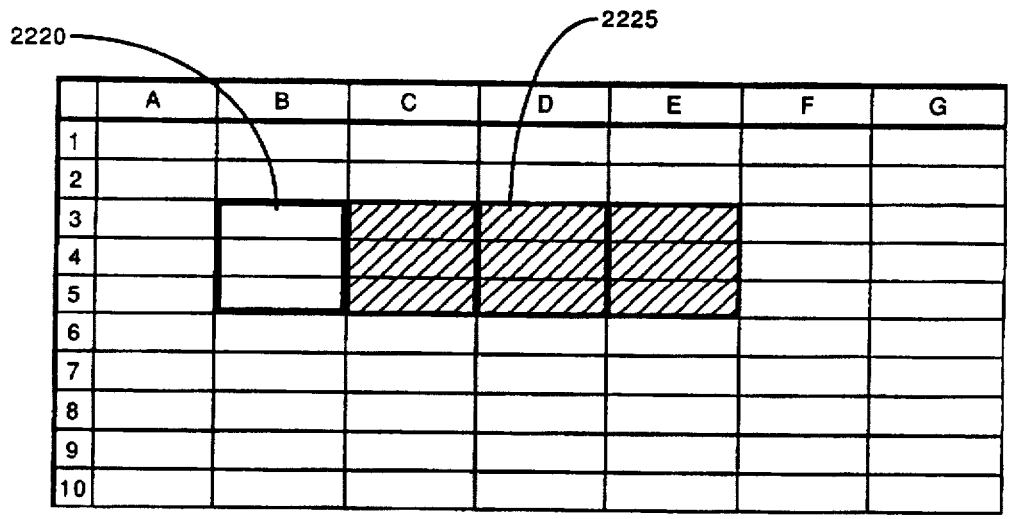

One embodiment of the present invention reduces the likelihood of undesired results from block replication by permitting only predetermined patterns of replication. In this embodiment of the invention only one dimensional blocks of cells (that is blocks containing either a single row or a single column of cells) can be replicated. FIGS. 22A and 22B illustrate this restrained replication method of the present invention. Recognizing that horizontal rows of cells are more appropriately replicated into a vertical block of similar horizontal rows, while vertical columns of cells are more appropriately replicated into a horizontal block of similar vertical columns, this embodiment of the present invention permits replication in only one direction for each type of block.

As shown in FIG. 22A, this embodiment of the present invention permits replication of a horizontal block 2200 only in a vertical direction, such as over range 2205 in FIG. 22A. Restrained replication in this manner prevents the undesired results that occurred in the prior art example shown in FIG. 21. If a formula in cell B3 of horizontal block 2200 is dependent on a cell in the same row but outside of horizontal block 2200 (such as cell A2, for example), because the block can only be replicated vertically, the dependent cells specified in the replicated blocks 2210a through 2210d (cells A3 to A6, respectively) lie outside the replication range. The overlapping displayed in the example of FIG. 21 and other potentially difficult to understand results are thereby prevented.

Similarly, as shown in FIG. 22B, the present invention permits replication of a vertical block 2220 only in a horizontal direction, such as over range 2225 of FIG. 22B.

Single cells may however be replicated in two dimensions, without restraint.

Mathematical and Logical Block Operations

Certain embodiments of the present invention also provide for efficient entry of formulas for mathematical and logical block operations into a cell. According to one embodiment, a mathematical or logical formula is entered into a cell by selecting the block of cells on which the operation is to be performed and entering a character specifying the operation into the cell into which the result of the operation is to be entered.

The present invention is suited for commutative arithmetic operations as well as others. Commutative arithmetic operations are operations such as addition and multiplication which result in the same number irrespective of the order in which the operation is performed on a set of numbers. For example, the sum of the numbers 1, 2 and 3 always equal 6, regardless of whether these numbers are added as 1+2+3, 2+1+3, 3+1+2, or any other order. Similarly, the product of the numbers 2, 3 and 4 always equals 24.

The present invention allows formulas for commutative arithmetic operations to be entered into a cell using a single character entry. Referring to the spreadsheet shown in FIG. 18, for example, the formula for cell F10 should specify that the content of cell F10 is equal to the product of the contents of cells C10 and D10. In the prior art, the required formula, for example "+C10*D10", must be entered into the cell character-by-character. In the present invention, the block of cells consisting of cells C10 and D10 is simply selected (for example, by using a directional double tap on cell C10), and a "*", the multiplication symbol, is written on cell F10. The entry in cell F10 is automatically interpreted to mean "+C10*D10", and that entry is stored as the content of cell F10. The same procedure can be used to specify the entries for cells F11 to F15. FIG. 23 shows the results after such entries have been made.

To enter the sum of cells F10 to F15 into cell F18, a similar procedure may be used. A block consisting of cells F10 to F15 is selected by writing a directional double tap with a down direction at cell F10, and a "+" sign is written in cell F18. This entry is automatically stored as "@SUM (F10 . . . F15) in cell F18.

This method of entering formulas into a cell, namely (1) selecting the cells on which the mathematical or logical operation is to be performed and (2) writing a single character representing the operation on the cell into which the formula is to be entered, may be used for commutative operations such as multiplication and addition and statistical operations such as averaging or calculating the standard deviation which are sequence independent, and for operations that are sequence dependant as well. For sequence dependent operations, care must be taken that cells on which the operation is to be performed are selected in the correct order. For example, in one embodiment of the present invention, to divide the contents of a first cell by the contents of a second cell, the first cell is selected first, then the second cell, and then a "divided by" sign is entered into the target cell.

We claim:

1. A method for entering and manipulating data for a spreadsheet cell comprising the steps of:

displaying a spreadsheet comprising said cell on a display;

entering a graphic element on said spreadsheet with an input device and a position indicator;

sampling said graphic element at a plurality of points;

generating descriptors for describing said graphic element in terms of relative change of position for each of said plurality of points at which said graphic element is sampled;

identifying positions of said descriptors;

automatically determining that said graphic element is associated with said cell based upon at least one of said positions of said descriptors; and storing said descriptors of said graphic element in memory as data for said cell.

2. The method of claim 1 wherein said graphic element comprises at least one handwritten character.

3. The method of claim 1 wherein said display comprises a display screen of a personal computer.

4. The method of claim 1 wherein said input device comprises a mouse.

5. The method of claim 1 wherein said input device comprises a position sensing screen for sensing the location of said position indicator.

6. The method of claim 5 wherein said position indicator comprises a hand-held stylus.

7. The method of claim 1 wherein said display comprises a position sensing screen for sensing the location of said position indicator.

8. The method of claim 1 wherein said input device comprises a touch sensitive panel for sensing the position of a person's finger in contact therewith.

9. The method of claim 1 wherein said graphic element comprises at least one stroke comprising a beginning point, an end point, and a curvilinear line connecting said beginning point and said end point.

10. The method of claim 9 wherein said descriptors comprise positional coordinates of said beginning point and descriptors of vectors between said beginning point and a first intermediate point along said curvilinear line and between successive intermediate points along said curvilinear line.

11. The method of claim 10 wherein said descriptors of said vectors comprise descriptors of horizontal components of said vectors and descriptors of vertical components of said vectors.

12. The method of claim 1 wherein said memory contains previously inputted data for said cell and wherein said descriptors are appended to said previously inputted cell data.

13. The method of claim 1 wherein said descriptors comprise descriptors having relative units of measure based on a reference measurement.

14. The method of claim 13 wherein said reference measurement comprises the area of a cell.

15. A method for treating a handwritten graphic element as data for a spreadsheet cell comprising the steps of:

sampling said graphic element at a plurality of points;

creating descriptors for describing said graphic element in terms of relative change of position for each of said plurality of points at which said graphic element is sampled;

automatically identifying a cell from said spreadsheet as a target cell for said graphic element; and storing said descriptors for said graphic element in memory as data from said spreadsheet.

16. The method of claim 15 wherein said graphic element comprises at least one stroke comprising a beginning point, an end point, and a curvilinear line connecting said beginning point and said end point.

17. The method of claim 16 wherein said graphic element comprises at least one handwritten character.

18. The method of claim 17 wherein said descriptors of said graphic element comprise positional coordinates of said beginning point and descriptors of vectors between said beginning point and a first intermediate point along said curvilinear line and between successive intermediate points along said curvilinear line.

19. The method of claim 18 wherein said descriptors comprise descriptors of horizontal components and descriptors of vertical components of said vectors.

20. The method of claim 15 wherein said graphic element is created using a mouse.

21. The method of claim 15 wherein said graphic element is created using a handheld stylus.

22. The method of claim 15 wherein said graphic element is displayed on a display screen and said target cell is identified by a location at which said graphic element is displayed on said display screen.

23. The method of claim 15 wherein said memory contains previously inputted data for said cell and wherein said descriptors are appended to said previously inputted cell data.

24. The method of claim 15 wherein said descriptors comprise descriptors having relative units of measure based on a reference measurement.

25. The method of claim 24 wherein said reference measurement comprises a vertical dimension of said cell.

26. A method for scaling a handwritten graphic element as data for a spreadsheet cell comprising the steps of:

sampling said graphic element at a plurality of points;

creating descriptors for describing said graphic element in terms of relative change in position for each of said plurality of points at which said graphic element is sampled;

determining a first dimension of said graphic element;

determining a first dimension of a display area of said cell;

determining a first scale factor for scaling said descriptors of said graphic element; and creating a scaled copy of said graphic element using said first scale factor, said scaled copy having a first dimension equal to or less than said first dimension of said display area of said cell.

27. The method of claim 26 further comprising the step of:

storing said descriptors and said first scale factor as data for said cell.

28. The method of claim 27 further comprising the steps of:

scaling said descriptors by said first scale factor; and displaying said scaled copy of said graphic element in said display area of said cell.

29. The method of claim 26 wherein said first dimension of said graphic element comprises a first dimension of bounds of said graphic element and said first dimension of said display area of said cell comprises a first dimension of bounds of said display area of said cell.

30. The method of claim 29 further comprising the steps of:

determining a second dimension of said graphic element;

determining a second dimension of a display area of said cell; and determining a second scale factor for scaling said descriptors of said graphic element; and creating said scaled copy of said graphic element using also said second scale factor, said scaled copy having a second dimension equal to or less than said second dimension of said display area of said cell.

31. The method of claim 30 wherein said second dimension of said graphic element comprises a second dimension of bounds of said graphic element and said second dimension of said display area of said cell comprises a second dimension of bounds of said display area of said cell.

32. The method of claim 31 wherein said descriptors comprise descriptors of horizontal components of said graphic element and descriptors of vertical components of said graphic element.

33. The method of claim 32 wherein said descriptors of said horizontal and vertical components of said graphic element are scaled by essentially the same factor so as to preserve an aspect ratio of said graphic element.

34. The method of claim 26 wherein said graphic element comprises at least one stroke comprising a beginning point, an end point, and a curvilinear line connecting said beginning point and said end point.

35. The method of claim 34 wherein said descriptors of said graphic element comprise positional coordinates of said beginning point and descriptors of vectors between said beginning point and a first intermediate point along said curvilinear line and between successive intermediate points along said line.

36. The method of claim 35 wherein said positional coordinates are specified relative to a first predetermined reference point.

37. The method of claim 36 wherein bounds of said graphic element comprise a first rectangular box having a vertical dimension and a horizontal dimension and wherein bounds of said display area of said cell comprise a second rectangular box having a vertical dimension and a horizontal dimension.

38. The method of claim 37 wherein said first reference point comprises a corner of said rectangular box.

39. The method of claim 38 wherein a scaled copy of said stroke is displayed in said display area of said cell at scaled positional coordinates of said beginning point relative to a second reference point for said display area of said cell, said scaled copy being displayed by displaying line segments corresponding to scaled descriptors of said vectors beginning at said scaled positional coordinates of said beginning point.

40. The method of claim 39 wherein said line segments comprising said graphic element are displayed at a predetermined thickness independent of a factor by which said descriptors of said graphic element are scaled.

41. The method of claim 26 wherein said first scale factor is determined by a ratio of a vertical dimension of bounds of said display area of said cell to a vertical dimension of bounds of said graphic element.

42. The method of claim 26 wherein said first scale factor is determined by the lesser of a ratio of a horizontal dimension of bounds of said display area of said cell to a horizontal dimension of bounds of said graphic element and a ratio of a vertical dimension of bounds of said display area of said cell to a vertical dimension of bounds of said graphic element.

43. With respect to a spreadsheet displayed on a display screen, a method for determining a target cell to which a handwritten graphic element, also displayed on said display screen, is directed, comprising the steps of:

identifying a display reference point for said graphic element;

determining a cell of said spreadsheet within which said display reference point is located; and designating said cell of said spreadsheet within which said display reference point is located as said target cell for said graphic element.

44. The method of claim 43 wherein said graphic element comprises at least one handwritten character.

45. The method of claim 43 wherein said graphic element comprises a plurality of handwritten characters.

46. The method of claim 43 wherein said display reference point comprises a center of area of said graphic element.

47. The method of claim 43 wherein said display reference point comprises a center of area of bounds of said graphic element.

48. The method of claim 43 wherein bounds of said graphic element comprise a rectangular box having a horizontal dimension and a vertical dimension.

49. The method of claim 48 wherein said display reference point comprises a point along a horizontal centerline of said rectangular box.

50. The method of claim 49 wherein display reference point comprises a point at a center of said horizontal centerline.

51. The method of claim 49 wherein said display reference point comprises a point located to one side of a center of said horizontal centerline.

52. The method of claim 43 wherein a position of said display reference point relative to said graphic element varies according to a relative size of said graphic element.

53. A method for processing and storing a handwritten graphic element generated on a display at a first level of magnification as data for a spreadsheet cell comprising the steps of:

sampling said graphic element at a plurality of points;

generating descriptors for describing said graphic element in terms of relative change in position for each of said plurality of points at which said graphic element is sampled;

determining a first reference measurement for said first magnification level;

converting said descriptors to relative descriptors comprising relative units of measure based on said first reference measurement; and storing said relative descriptors as data representing said graphic element for said spreadsheet cell.

54. The method of claim 53 wherein said first reference measurement comprises a vertical dimension of said cell.

55. The method of claim 53 further comprising the steps of:

determining a second reference measurement at a second magnification level;

converting said relative descriptors to scaled descriptors based on said second reference measurement; and displaying a scaled graphic element described by said scaled descriptors on said display.

56. A method for processing and storing a handwritten graphic element generated on a display at a first level of magnification as data for a spreadsheet cell comprising the steps of:

sampling said graphic element at a plurality of points;

generating descriptors for describing said graphic element in terms of relative change in position for each of said plurality of points at which said graphic element is sampled;

determining a magnification level identifier for said first level of magnification; and storing said descriptors and said magnification level identifier as data representing said graphic element for said cell.

57. The method of claim 56 wherein said magnification level identifier comprises a reference measurement.

58. The method of claim 57 wherein said reference measurement is a vertical dimension of said cell at said first level of magnification.

59. The method of claim 57 wherein said reference measurement is an area of said cell at said first level of magnification.

60. The method of claim 56 wherein said magnification level identifier comprises a magnification factor determined by a ratio of said first level of magnification to a base level of magnification.

61. The method of claim 56 wherein said data comprising said descriptors and said magnification level identifier is appended to existing cell data.

62. The method of claim 61 wherein said existing cell data comprises descriptors and a second magnification level identifier for a second graphical element generated at a second magnification level.

63. A method for displaying a handwritten graphic element generated on a display at a first level of magnification as data for a spreadsheet cell at a second level of magnification, comprising the steps of:

sampling said graphic element at a plurality of points;

generating descriptors for describing said graphic element in terms of relative change in position for each of said plurality of points at which said graphic element is sampled;

determining a display factor representing a ratio of said second level of magnification to said first level of magnification;

generating scaled descriptors by scaling said descriptors by said display factor; and displaying a scaled graphic element described by said scaled descriptors on said display at said second level of magnification.

64. The method of claim 63 wherein said display factor is determined by a ratio of a first magnification level identifier for said first level of magnification to a second magnification level identifier for said second level of magnification.

65. The method of claim 64 wherein said first magnification level identifier comprises a reference measurement for said first level of magnification and said second magnification level identifier comprises a second reference measurement for said second level of magnification.

* * * * *

UNITED STATES PATENT AND TRADEMARK OFFICE
CERTIFICATE OF CORRECTION

PATENT NO.     : 5,717,939
DATED          : February 10, 1998
INVENTOR(S)    : Daniel Bricklin et al.

It is certified that error appears in the above-identified patent and that said Letters Patent is hereby corrected as shown below:

Column 4,
Line 49, change "("C+C10*D10")" to -- ("+C10*D10") --.

Column 7,
Line 41, change "expected to a cell" to -- contained in a cell --.

Column 10,
Line 1, change "dose" to -- close --.
Line 50, change ""delta's"" to -- "deltas" --.

Column 22,
Line 41, change "no valid match, the entry is" to -- target cell at block 1564. If --.

Column 23,
Line 26, change "The example" to -- In the example --.

Column 31,
Line 36, change "formula the" to -- formula --.

Column 32,
Line 23, change "equal" to -- equals --.

Signed and Sealed this

Thirty-first Day of December, 2002

JAMES E. ROGAN
*Director of the United States Patent and Trademark Office*